United States Patent
Batra et al.

(10) Patent No.: US 10,271,301 B2
(45) Date of Patent: Apr. 23, 2019

(54) SYSTEMS AND METHODS FOR TRACKING ITEMS

(71) Applicant: SekureTrak, Inc., Chicago, IL (US)

(72) Inventors: Parminder K. Batra, Chicago, IL (US); Fadi Kahhaleh, Tinley Park, IL (US); Rien Heald, Aurora, IL (US)

(73) Assignee: SekureTrak, Inc., Chicago, IL (US)

( * ) Notice: Subject to any disclaimer, the term of this patent is extended or adjusted under 35 U.S.C. 154(b) by 0 days.

(21) Appl. No.: 15/636,449

(22) Filed: Jun. 28, 2017

(65) Prior Publication Data

US 2017/0374641 A1 Dec. 28, 2017

Related U.S. Application Data

(60) Provisional application No. 62/355,656, filed on Jun. 28, 2016.

(51) Int. Cl.
*H04B 17/27* (2015.01)
*H04W 64/00* (2009.01)
*H04B 17/318* (2015.01)
*H04W 4/80* (2018.01)

(52) U.S. Cl.
CPC .......... *H04W 64/006* (2013.01); *H04B 17/27* (2015.01); *H04B 17/318* (2015.01); *H04W 4/80* (2018.02)

(58) Field of Classification Search
CPC ...... H04W 64/006; H04W 4/80; H04B 17/27; H04B 17/318
USPC .............................................. 455/456.1–457
See application file for complete search history.

(56) References Cited

U.S. PATENT DOCUMENTS

| | | | |
|---|---|---|---|
| 8,026,814 B1 | 9/2011 | Heinze et al. | |
| 9,332,477 B2 * | 5/2016 | Lee | H04W 36/32 |
| 2009/0058653 A1 | 3/2009 | Geissler et al. | |
| 2015/0119076 A1 | 4/2015 | Cohen | |

(Continued)

OTHER PUBLICATIONS

Wouter Bulten, Kalman Filters Explained: Removing Noise from RSSI Signals, Oct. 11, 2015.*

(Continued)

*Primary Examiner* — Marisol Figueroa
(74) *Attorney, Agent, or Firm* — Quarles & Brady LLP

(57) ABSTRACT

An example system includes a first beacon configured to communicate a first wireless signal. A first hub is in communication with the first beacon. The first hub is configured to detect a first signal strength of the first wireless signal. The example system further includes a second hub in communication with the first beacon. The second hub is configured to detect a second signal strength of the first wireless signal. The example system further includes a computing system in communication with the first hub and the second hub. The computing system includes a noise filter and a beacon assignor. The noise filter includes a quadratic estimator configured to output a first estimated distance between the first beacon and the first hub, output a second estimated distance between the first beacon and the second hub, and disregard a third estimated distance between the first beacon and the first hub if the third estimated distance is derived from a ghost signal. The beacon assignor is configured to assign the first beacon to the first hub if the first estimated distance is less than the second estimated distance.

20 Claims, 12 Drawing Sheets

(56) References Cited

U.S. PATENT DOCUMENTS

2015/0356858 A1    12/2015   Daoura et al.
2018/0038937 A1*   2/2018    Afzal .................. G01S 5/12

OTHER PUBLICATIONS

International Search Report and Written Opinion issued in International Application No. PCT/US2017/039815, dated Sep. 18, 2017, 9 pages.

* cited by examiner

SYSTEMS AND METHODS FOR TRACKING ITEMS

RELATED APPLICATIONS

This applications claims the benefit of and priority to U.S. Provisional Application No. 62/355,656, titled "System and Method for Tracking Items" and filed on Jun. 28, 2016. The disclosure of U.S. Provisional Application No. 62/355,656 is incorporated by reference herein in its entirety.

FIELD

The present disclosure relates generally to tracking items within an area. More particularly, the present disclosure relates to tracking items using a network of wireless communication hubs and beacons.

BACKGROUND

Trackable items are often used within a building or area such as, for example, a manufacturing plant, a construction site, or a hotel. For example, a hotel may have towels, bed sheets, lamps, rollaway beds, cribs, service trays, cleaning supplies, etc. A manufacturing plant may have tools, parts, pallets, storage containers, etc. A construction site may have machines, tools, hardware, building supplies, garbage receptacles, etc. During operation, the items may be moved or relocated.

Figure 1:
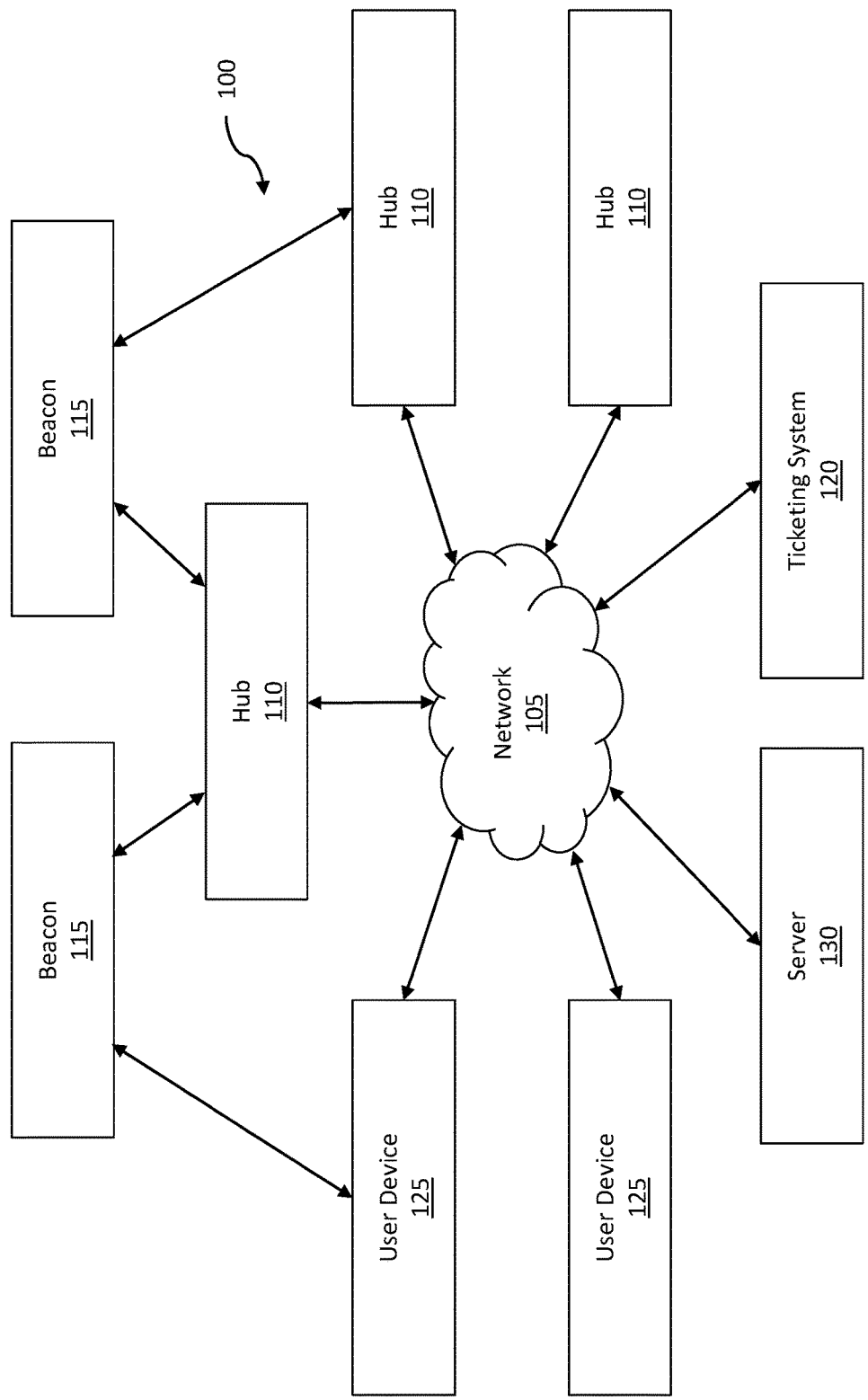
FIG. 1 is a block diagram of an item management system in accordance with the teachings of this disclosure.

The drawings are not to scale.

DETAILED DESCRIPTION

Although the following systems and methods are described in the context of a hotel, the teachings of this disclosure are applicable to any type of building, business, manufacturing plant, construction site, and/or any other area.

For example, a hotel may have a large inventory of mobile or portable supplies such as towels, bed sheets, pillows, rollaway beds, cleaning supplies, food trays, food carts, luggage carts, cleaning carts, entertainment devices (e.g., digital video disc (DVD) players, gaming systems), etc. The hotel may be more efficient (financially and operationally) if such items are used properly and the inventory of such items is kept to a minimum, while still being able to meet the needs of guests or clients. Thus, it may be beneficial to such a hotel to keep track of, for example, individual rollaway beds to enable the hotel to locate the beds and identify which individual beds have been used, for how long, how many times the beds have been used over a period of time, etc. Thus, instead of a hotel knowing that it has, for example, six rollaway beds and that two are being used, the hotel may know that it has rollaway beds labeled A-F, that rollaway beds C and F are being used, that rollaway beds A and B are in a first closet, and that rollaway beds D and E are in a second closet. Further, the hotel may review the history of use of rollaway beds A-F and determine that, for example, at most two beds are used at any given time. The additional knowledge may be useful to the hotel in creating efficiencies and better serving customers.

Additionally, each item may have a useful life. By tracking which items are used, and for how long, an item management system may predict maintenance or failures before an item begins to cause or have problems. Further, by tracking individual items, the items best suited for a client may be identified and sent to the client.

Example item management systems disclosed herein enable items to be tracked and/or managed. An example item management system may include a plurality of beacons, a plurality of hubs, and a computing system in communication with the beacons and/or the hubs via a network. In some embodiments, the beacons are coupled to portable items (e.g., carts, rollaway beds, microwaves, etc.). The beacons may periodically communicate wireless signals, such as Bluetooth® signals. If the beacons are within listening ranges of one or more hubs, the one or more hubs receive the wireless signals and then communicate information encoded in the wireless signals to the computing system via the network. The computing system then determines locations of the beacons and/or the items, usages of the items, remaining useful lives of the items, and/or performs one or more additional and/or alternative actions.

In some embodiments, the wireless signals communicated by the beacons generate ghost signals. For example, the wireless signals may take multiple paths to the hubs if the wireless signals bounce off objects, walls, and/or other structures and/or travel through different mediums (e.g., air, water, glass, walls, etc.). As a result, when a beacon generates a wireless signal, a hub may receive the wireless signal via a first path and a second path different than the first path. The wireless signal communicated via the second path may be a ghost signal. If the computing system processes the ghost signal to determine a location of the beacon, the computing system may output an inaccurate location or indicate that the beacon is moving when the beacon is stationary. The example computing systems disclosed herein identify and filter out ghost signals to enable the item management systems to accurate track the beacons and, thus, the items to which the beacons are coupled.

FIG. 1 is a block diagram of an item management system 100 in accordance with the teachings of this disclosure. In some embodiments, the item management system 100 includes additional, fewer, and/or different components and/or configurations. The item management system 100 of FIG. 1 includes a network 105, a plurality of hubs 110, a plurality of beacons 115, a ticketing system 120, a plurality of user devices 125, and a server 130.

The network 105 may be any suitable communications network. The network 105 may include wired and/or wireless communications. The network 105 may include a local area network (LAN), a wide area network (WAN), a mobile communications network (e.g., a cellular network), the Internet, etc. In an illustrated embodiment, the network 105 may include a LAN that is connected to the Internet. The network 105 may use any suitable communications protocols. The hubs 110, the ticketing system 120, and the user devices 125 may communicate with each other (and other devices) via the network 105. In some embodiments, one or more communication devices communicate directly with one another and may not use network 105.

As shown in FIG. 1, a plurality of hubs 110 are communicatively coupled to the network 105, and a plurality of beacons 115 are communicatively coupled to the hubs 110. The hubs 110 are configured to receive wireless signals from the beacons 115. In some embodiments, the wireless signals from the beacons 115 are identification signals. Each hub 110 is communicatively coupled to the network 105. In some embodiments, each hub 110 is in a location or area such as in a closet, in a hallway, in a room, etc. In some embodiments, one or more of the hubs 110 are fixed relative to Earth (e.g., coupled to a stationary item or object such as a wall, a floor, a shelf, and/or any other stationary item or objection). In some embodiments, one or more hubs 110 may be fixed to a movable object, such as a cart, a chair, and/or any other movable object. In some embodiments, hubs 110 are powered via wired electricity, such as 120 Volts alternating current (VAC), via Ethernet, and/or any other type of wired electricity. In some embodiments, hubs 110 may be powered via non-wired power, such as a battery.

In some embodiments, the beacons 115 are coupled to portable or movable objects. For example, a beacon 115 may be coupled to a rollaway bed. In some embodiments, the beacons 115 are stationary (e.g., mounted to a wall, rested on a shelf, etc.). Each beacon 115 may be assigned a unique beacon identification code. The identification code may be any suitable code such as a random or arbitrary series of letters and/or numbers, a code, a name, a description, etc. Each beacon 115 may be coupled to an item or object that is to be tracked. The identification code of the beacon 115 may be associated with the object to which it is attached in a database that may be stored, for example, in server 130.

In the illustrated embodiment, the beacon 115 is in communication with one or more of the hubs 110 and/or the beacons 115 via, for example, near field communication (NFC), Bluetooth® 4.0 (Bluetooth® low energy (BLE), Bluetooth® Smart, or any other version of Bluetooth® technology), ZigBee®, IEEE® standard 802.11, and/or any additional and/or alternative communications. In some embodiments, the beacons 115 include batteries to supply the beacons 115 with power. In some embodiments, beacons 115 are passive devices without a battery. In some embodiments, beacons 115 are semi-passive or active devices. For example, beacons 115 may employ radio frequency identification (RFID) technology. In some embodiments, the beacons 115 may communicate information via a local area wireless computer network (Wi-Fi).

In some embodiments, the beacons 115 substantially constantly communicate an identification signal. In other embodiments, the beacons 115 periodically communicate an identification signal (e.g., every 3 seconds, every 5 seconds, every 8 seconds, and/or any other rate of occurrence) and/or communicate an identification signal based on an event. For example, beacons 115 may send an identification signal when physically moved, when a button of the beacon 115 is pressed, when the beacon 115 detects a vibration or noise, when queried by another device (such as hub 110), etc.

Thus, in some embodiments, as a beacon 115 moves into and out of a communication range with one or more hubs 110 and/or another beacon 115, the hubs 110 and/or the beacons 115 may be used to track the movement of the beacon 115. As described in greater detail in connection with FIG. 6 below, in some embodiments, the hubs 110 have predetermined communication ranges, which may correspond to, for example, a predetermined area such as a room, a closet, a portion of a hallway, a lobby, and/or any other suitable area. Thus, when a beacon 115 is in communication range with a hub 110 and/or another beacon 115, the hub 110 and/or the beacon 115 may receive the identification signal from the beacon 115, and it may be determined that the beacon 115 is located by the hub 110 and/or the other beacons 115. Accordingly, the current location of beacon 115 may be known if the beacon 115 is within communication range of at least one hub 110 or another beacon 115. Further, a historical record may be created to determine where the beacon 115 has been and/or a path the beacon 115 has taken.

For example, a food tray may be tagged with a beacon 115. As described in greater detail below, when the beacon 115 is in the kitchen while the food is being prepared, the beacon 115 may be associated by the item management system 100 with a particular room service order of a hotel client via the ticketing system 120. When the tray is loaded with the client's ordered food, the tray may be placed, for example, on a warming shelf. A hub 110 may be coupled to the warming shelf. When the tray is placed on the warming shelf and close to the hub 110, the item management system 100 (e.g., ticketing system 120), may indicate to an employee (e.g., via user device 125) that the client's food is ready to be delivered. The employee may then deliver the food to the client's room. When the client is finished with the food tray, the client may place the tray into the hallway. One or more hubs 110 may be located in the client's room and/or in the hallway. The item management system 100 may determine, based on an identification signal received by one or more hubs 110, that the tray is in the hallway and may indicate to an employee to retrieve the food tray. Accordingly, some embodiments may be used to create efficiencies within an organization (e.g., a hotel). For example, the amount of time that a food tray is left in a hallway may be minimized.

As shown in FIG. 1, a hub 110 may be in communication range of one or more beacons 115, or a hub 110 may be in communication range of none of the beacons 115. Additionally, in some embodiments, multiple hubs 110 may be in communication with the same beacon 115. For instance, the communication range of the multiple hubs 110 may overlap, and a beacon 115 may be located within the overlapping area. As discussed in greater detail below in connection with FIG. 3 and FIG. 7, the system 100 may determine that the beacon 115 is closest to the hub 110 based on, for example, the strongest signal communicated from the beacon 115 to the hub 110. Although not shown in FIG. 1, in some embodiments, the hubs 110 may communicate with each other.

In some embodiments, an item management system 100 includes one or more user devices 125. The user devices 125 may be any suitable communications device that communicates with the network 105 and/or beacons 115. For example, the user device 125 may be a computer, a laptop, a smart device such as a smart phone, a tablet, and/or any other suitable user device.

In some embodiments, the user devices 125 are configured to communicate with the beacons 115. For example, a user device 125 may be a smart phone. In some such embodiments, the user device 125 is configured to determine the location of the user device 125. For example, the user device 125 may employ GPS, internal accelerometers, signal strength from fixed location devices (such as routers), and/or one or more additional devices and/or techniques to determine its location. Thus, when the user device 125 is in communication range of a beacon 115, it may determine that the beacon 115 is near the location of the user device 125. Although not illustrated in FIG. 1, in some embodiments, user devices 125 may be configured to communicate with each other and/or with hubs 110.

In some embodiments, the item management system 100 may include one or more servers 130. The one or more servers 130 are in communication with the hubs 110, the user devices 125, and/or the ticketing system 120 via the network 105. In some embodiments, the one or more servers 130 may be in direct communication with the hubs 110, the user devices 125, and/or the ticketing system 120. The server 130 is configured to track the locations of the one or more beacons 115. For example, when a beacon 115 is in communication range of a hub 110, the hub 110 may indicate to the server 130 that the beacon 115 is in communication range of the hub 110. The server 130 may store the information and notify a user of the location of the beacon 115. In some embodiments, the server 130 may be in communication with the ticketing system 120 to efficiently manage items marked with beacons 115. The server 130 and the ticketing system 120 are discussed in greater detail below.

In some embodiments, item management system 100 is a theft deterrent and/or recovery system. For example, if a beacon 115 associated with an item has not been detected by a hub 110 or a user device 125 after a threshold amount of time (which may be item specific), the item management system 100 may determine that the item is outside a predetermine area. If the item's departure is unauthorized, the item management system 100 may determine that the item was stolen. In some instances, a location history of the item may be used to determine what happened to the item. For example, if the beacon 115 associated with the item was last detected by a hub 110 at an employee entrance at 5:03 PM, employees who got off of work at 5:00 may be questioned, investigated, etc. to help determine what happened to the item. In another example, if the beacon 115 associated with the item was last detected by a user device 125 checked out to a particular employee, the particular employee may be used to help determine what happened to the item or where it was last seen. In some embodiments, the location history of the beacon 115 includes the last known/logged location. In some embodiments, the location history includes tracking information such as the locations that the beacon 115 was detected. For instance, the location history may have the last five (or ten, fifty, etc.) hubs 110 or mobile devices 125 that detected the beacon 115. In another example, the location history may store the location of the beacon 115 every minute (or five minutes, thirty minutes, hour, two hours, etc.).

In some embodiments, one or more hubs 110 are located at ingress and/or egress locations of a building, site, and/or area. When a beacon 115 passes by the hubs 110 at the ingress and/or egress locations, the system 100 may determine that a beacon 115 is entering or exiting the building. Such information may be used, for example, to alert a user (e.g., a manager, a staff member, etc.) that a beacon 115 is leaving the building, site, and/or area. Similarly, in some embodiments, a hub 110 at an ingress and/or egress of a building may be used to alert a user that a beacon 115 is entering the building, site, and/or area.

In some instances, the beacons 115 may include a location detection device, such as GPS, and a communications device that may communicate to server 130 and/or ticketing system 120 remotely, for example via Wi-Fi and/or a cellular network. If a beacon 115 detects that the beacon 115 is not within range of a hub 110 or a user device 125 for a threshold period of time, the beacon 115 may communicate to the server 130 and/or ticketing system 120 the location of the beacon 115. The location of the beacon 115 may then be used to locate and/or recover the beacon 115 and the tagged item.

Figure 2:
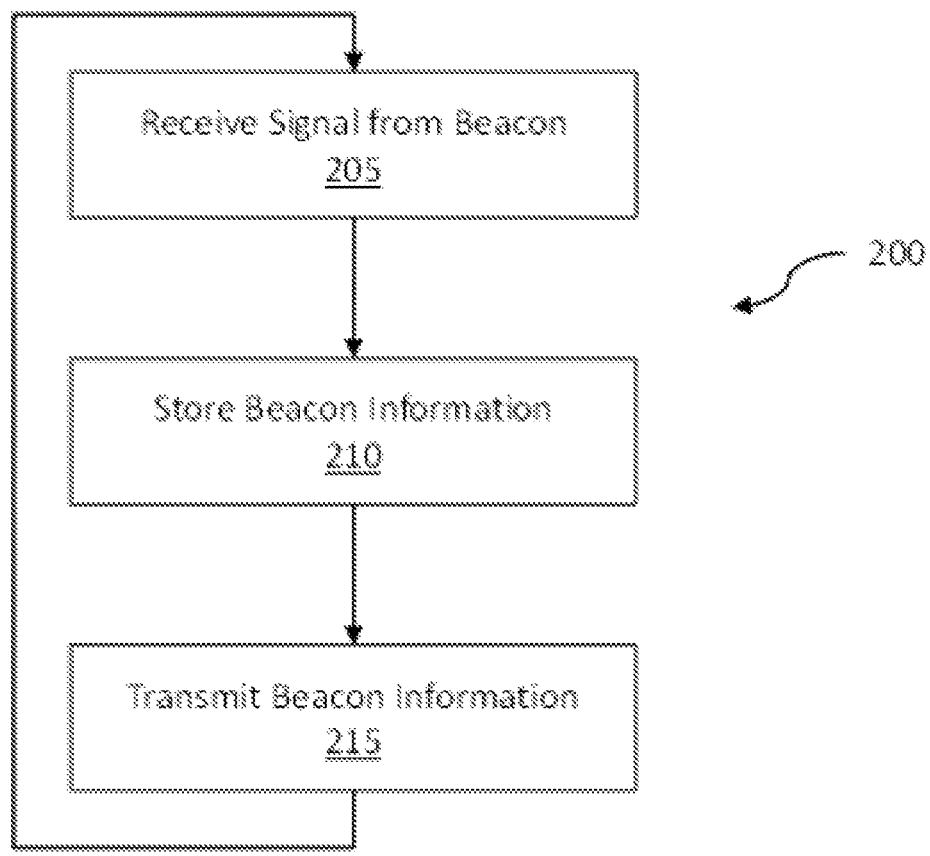
FIG. 2 is a flowchart representative of example machine readable instructions that may be executed to implement the example item management system of FIG. 1 to identify beacons in accordance with the teachings of this disclosure.
Figure 3:
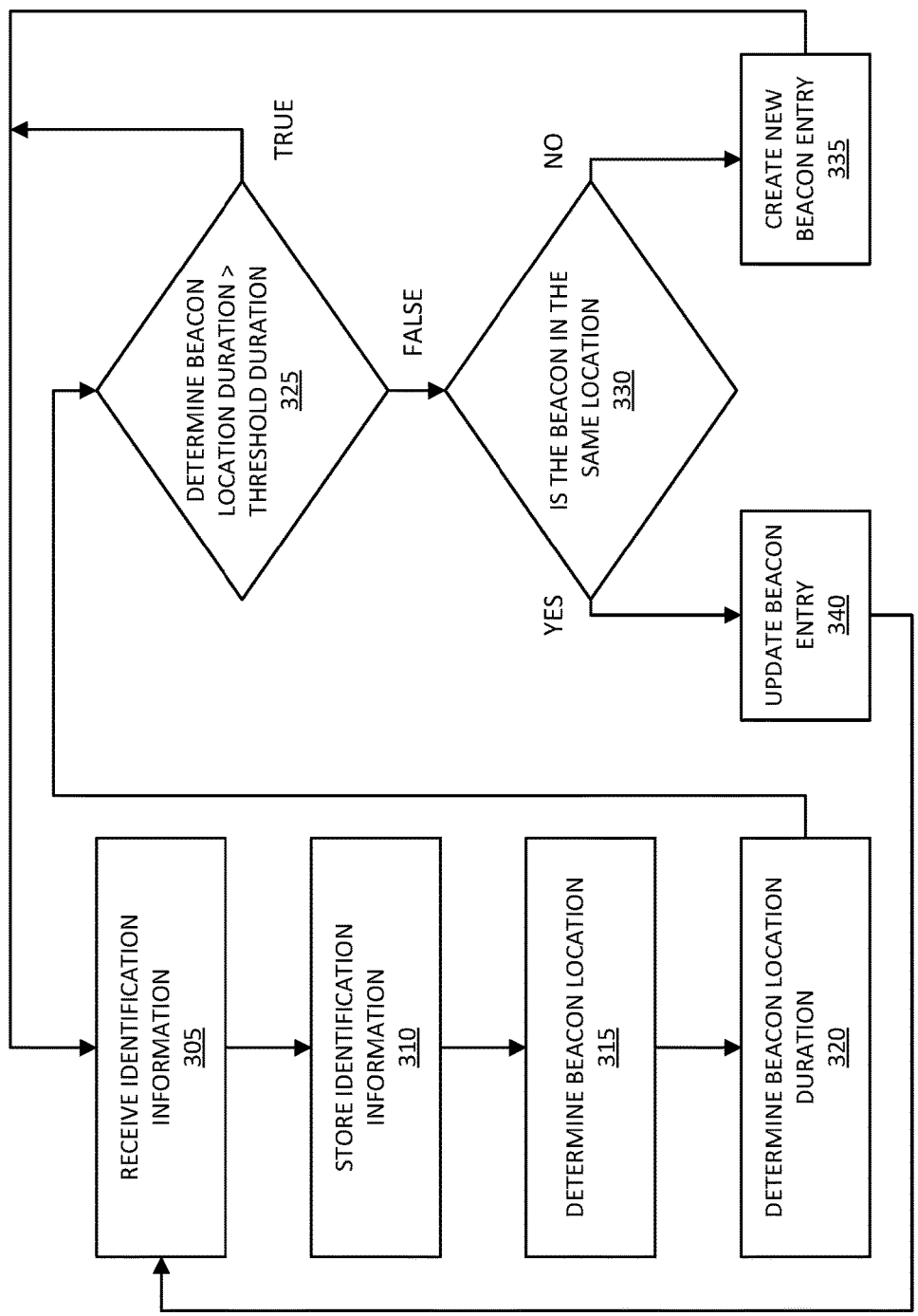
FIG. 3 is a flowchart representative of example machine readable instructions that may be executed to implement the example item management system of FIG. 1 to track locations of beacons in accordance with the teachings of this disclosure.

Flowcharts representative of example machine readable instructions for implementing the example system 100 of FIG. 1 are shown in FIGS. 2-3. The example machine readable instructions may be executed by one or more processors such as processor 405 of FIG. 4 and/or processor 704 of FIG. 7, which are described in greater detail below. The instructions may be embodied in machine readable instructions stored on a tangible and/or non-transitory computer readable storage medium such as a CD-ROM, a floppy disk, a hard drive, a digital versatile disk (DVD), a Blu-ray disk, or a memory associated with the processor, but the instructions and/or parts thereof could alternatively be executed by a device other than the processor and/or embodied in firmware or dedicated hardware. Further, although the example machine readable instructions are described with reference to the flowcharts illustrated in FIGS. 2-3, many other methods of implementing the example system 100 of FIG. 1 may alternatively be used. For example, the order of execution of the blocks may be changed, and/or some of the blocks described may be changed, eliminated, and/or combined.

The example methods of FIGS. 2-3 may be implemented using coded instructions (e.g., computer and/or machine readable instructions) stored on tangible and/or one or more non-transitory computer and/or machine readable mediums such as a hard disk drive, a flash memory, a read-only memory, a compact disk, a digital versatile disk, a cache, a random-access memory and/or any other tangible and/or one or more non-transitory computer and/or machine readable mediums for any duration (e.g., for extended time periods, permanently, for brief instances, for temporarily buffering, and/or for caching of the information).

FIGS. 2-3 are flowchart representative of example machine readable instructions that may be executed to implement the system 100. Although the flowcharts of FIGS. 1-2 depict example steps in a given order, these steps are not exhaustive, various changes and modifications may be affected by one skilled in the art within the spirit and scope of the disclosure. For example, blocks illustrated in the flowcharts may be performed in an alternative order or may be performed in parallel.

FIG. 2 is a flow diagram of a method of identifying beacons 115 in accordance with the teachings of this disclosure. The method 200 of FIG. 2 includes receiving a signal from a beacon (block 205), storing beacon information (block 210) and transmitting the beacon information (block 215). In some embodiments, the method 200 is performed by a hub 110 and/or a user device 125. In some embodiments, the method 200 may be performed by any suitable device.

In some embodiments, a beacon 115 transmits signals that identify the beacon 115 and/or provide information related to the beacon 115 or the item to which the beacon 115 is associated. When the beacon 115 is within communication range of a hub 110 or a user device 125, the signal transmitted by the beacon 115 may be received by the hub 110 or the user device 125, respectively, at block 205. The signal may be any suitable signal and may contain any suitable information such as, for example, a Universally Unique Identifier (UUID), a Major value or integer, a Minor value or integer, a Measured Power or Signal-to-Noise Ratio (SNR), a transmission power of the signal, a function of the Measured Signal-to-Noise Ratio and/or the transmission power, information related to a battery of the beacon 115, and/or any other suitable information. The signal may be an RFID signal, a Bluetooth® Smart signal, a Wi-Fi signal, and/or any other type of signal.

In some embodiments, a beacon 115 includes a sensor that may determine when the beacon 115 is no longer coupled to an item. For example, the sensor may determine that the beacon 115 has fallen off of the item to which it was fixed. Any suitable sensor may be used. For example, magnetism may be used to determine that a beacon 115 is not fixed to a magnetic item (e.g., a bed frame), a switch may be used to determine that a strap holding the beacon 115 to the item has loosened and/or broken, a piezoelectric sensor may determine that the beacon 115 is not vibrating with the item to which it was attached, etc. In such embodiments, when it is determined that the beacon 115 is no longer fixed to the item, the beacon 115 may transmit such information to a hub 110 and/or a mobile device 125. The system 100 may process the information (e.g., by transmitting such information to the server 130 and/or the ticketing system 120, by displaying a notification on the mobile device 125 that received the information from the beacon 115, etc.) to notify a user that the beacon 115 is no longer attached to the item. In some embodiments, ticketing system 120 may produce a work order to check and/or repair the beacon 115.

The signal may include information related to the beacon 115 that communicated the signal. For example, the signal may include an identification of the beacon 115, a battery power level of the beacon 115, a temperature of the beacon 115, a status indicator of the beacon 115, an error code, a time code, etc. At block 210, the hub 110 or the user device 125 that receives the signal may store the information sent via the signal in a local memory device in operation store beacon information.

In some embodiments, the information communicated by the beacon 115 indicates a status of the item to which the beacon 115 is fixed. For example, the beacon 115 may be fixed to a rollaway bed. The information transmitted by the beacon 115 may include an indication of whether the bed is made (e.g., whether the bed has been fitted with sheets). In some such examples, the beacon may have a switch, button, or other interface that a user may activate to indicate whether the bed is made or not. In some embodiments, a user may use a user device 125 to indicate whether the bed is made. Such an indication may be transmitted to the server 130 or the ticketing system 120 and may not be transmitted from the beacon. In some embodiments, user device 125 transmits a signal to the beacon 115 to indicate to the beacon 115 whether the bed is made.

The hub 110 or the user device 125 transmits the beacon information at block 215. The hub 110 or the user device 125 may transmit the beacon information using any suitable method, for example via network 105. The hub 110 or the user device 125 may transmit the beacon information to any suitable device such as server 130 or ticketing system 120. In some embodiments, the beacon information may be transmitted to a cloud computing system. As illustrated in FIG. 2, the beacon identification method 200 may be repeated. In some instances, the hub 110 or the user device 125 may be constantly and/or periodically listening for a signal from a beacon 115.

In some embodiments, transmitting beacon information (block 215) may include transmitting more information than was received from the beacon 115. For example, transmitting beacon information may include transmitting hub 110 or user device 125 identification information, a time code, an error code of the hub 110 or user device 125, an indication of the signal strength of the signal received from the beacon 115, a battery power level of the hub 110 or user device 125, a duration that the hub 110 or user device 125 received the signal (or multiple signals) from the beacon 115, a location of the hub 110 or the user device 125 (e.g., via a location detection system on the user device 125), and/or additional and/or alternative information.

FIG. 3 is a flow diagram of a method of tracking the location of beacons in accordance with the teachings of this disclosure. The example method 300 includes receiving identification information (block 305), storing identification information (block 310), determining beacon location (block 315), determining beacon location duration (block 320), comparing the determined beacon location duration to a threshold duration in operation (block 325), determining whether the beacon is in the same location (block 330), creating a new beacon entry (block 335), and updating beacon entry (block 340). The example method 300 of FIG. 3 may be performed by any suitable device such as server 130 and/or ticketing system 120.

In the illustrated embodiment, the method 300 begins at block 305 when identification information related to a hub and/or a beacon is received by the server 130 and/or the ticketing system 120. In some embodiments, the identification information may be the information transmitted in connection with block 215 of FIG. 2. In some embodiments, the identification information may include a hub 110 or user device 125 identification code, a beacon 115 identification code, an indication of the signal strength of the signal received from the beacon 115 at the hub 110 or user device 125, an indication of the battery strength of the beacon 115, and/or additional and/or alternative information. The identification information received in operation 305 is stored at block 310. The information may be stored in a memory storage device.

The location of the beacon 115 is determined at block 315 by the server 130 and/or the ticketing system 120. The location may be determined based on the identification information received from the beacon. In some embodiments, a database may contain the location of various hubs 115. For example, the identification information received (block 305) may contain beacon 115 identification information "Beacon AA" and hub 110 identification information "Hub BB." The hub 110 identification information "Hub BB" may be cross-referenced in a database to determine that, for example, "Hub BB" is located in a storage closet on the west wing of the second floor of a building. Thus, it may be determined that "Beacon AA" is in the storage closet on the west wing of the second floor of the building.

As indicated above, in some embodiments, a beacon 115 may transmit a signal that is received by multiple hubs 110 or user devices 125. Thus, in some embodiments, receiving identification information (block 305) may include receiving the beacon 115 identification information from multiple hubs 110 or user devices 125. For example, a hub 110 labeled "Hub AB" may be a storage closet on the first floor and a hub 110 labeled "Hub XY" may be a storage closet on the second floor of the same building. The storage closets on the first and second floor may be located at the same floor plan location, but on different levels. That is, "Hub AB" may be directly below "Hub XY." In such an example, "Hub AB" may be fifteen feet below "Hub XY." A beacon 115 labeled "Beacon QT" may be attached to a rollaway bed that is wheeled into the first floor storage closet. "Beacon QT" may be in communication range of both "Hub AB" and "Hub XY." Accordingly, both "Hub AB" and "Hub XY" may transmit to, for example, server 130 information including the beacon identification code "Beacon QT," the respective hub 110 identification code, and the respective signal strength of "Beacon QT."

In such an example, although "Beacon QT" is within communication range of both "Hub AB" and "Hub XY," because "Beacon QT" is closer to "Hub AB" (because the beacon is in the same closet as "Hub AB"), the signal received from "Beacon QT" at "Hub AB" will be stronger than the signal received from "Beacon QT" at "Hub XY." Thus, in some embodiments, determining beacon location (block 315) may include comparing the signal strength of a beacon 115 received at a first hub 110 (or user device 125) to the signal strength of the beacon 115 received at a second hub 110 (or user device 125). It may be determined that the beacon 115 is at the location of the hub 110 (or user device 125) that has the strongest signal strength. In some embodiments, location of the beacon 115 is determined via the example method 1000 illustrated in FIGS. 10-12.

In other embodiments, any suitable information may be used to determine the location of beacon 115. For example, the identification information received in operation 305 may include a beacon 115 identification code, an indication that the beacon 115 signal was received by a user device 125 (such as a smartphone), and a location of the user device 125 (e.g., determined by the user device 125 via GPS). In such an example, it may be determined that the beacon 115 is at the location of the user device 125.

The duration that the beacon 115 has been at the determined location is determined at block 320 by the server 130 and/or the ticketing system 120. For example, it may be determined that a beacon 115 is in a broom closet. The length of time that the beacon 115 has been in the broom closet may be determined. For example, when it is determined that a beacon 115 is at a location, such information may be stored with a timestamp in a database. Thus, when it is subsequently determined that the beacon 115 is at the location, the database may be searched to determine where the beacon 115 was last reported to be. If the location is the same as the last entered location for the beacon 115, the current time may be compared to the time that the beacon 115 arrived at the location.

In some embodiments, the information received (block 305) is stored permanently or long-term. In some embodiments, the information received is stored temporarily at block 310. For example, the information may be stored for 30 seconds, a minute, ten minutes, an hour, a day, a week, a year, etc. If it is determined that the beacon has been at the same location for a threshold duration (block 325), some or all of the information received at block 305 may be stored by the server 130 and/or the ticketing system 120. Thus, in some embodiments, the time that the beacon 115 has been in the same location may be based on the beacon location duration.

At block 325, the determined beacon location duration may be compared to a threshold duration by the server 130 and/or the ticketing system 120. The threshold duration may be any suitable duration. The threshold duration may be determined based on how frequently location information of the beacons 115 should be stored. In some embodiments, the threshold duration is ten minutes. That is, every ten minutes that a beacon 115 is in communication with a hub 110, the received information may be stored in a database (such as the second, long-term database described above). In other embodiments, the threshold duration may be a second, thirty seconds, a minute, fifteen minutes, an hour, a day, a week, etc. If the determined beacon location duration is less than the threshold duration, then the example method 300 may return to block 305.

If the determined beacon location duration is greater than the threshold duration, then it is determined whether the beacon 115 is in the same location at block 330. If the beacon 115 is not in the same location, then a new entry in a database (such as the long-term database) may be made at block 335 by the server 130 and/or the ticketing system 120. The new entry in the database may include the beacon 115 identification code, the identification code of the hub 110 or the user device 125 that received the beacon's signal, the location of the beacon 115, the temperature of the beacon 115, signal strength of the beacon 115, a battery power indication of the beacon 115, a time stamp, whether the beacon 115 is still fixed to the item, and/or additional and/or alternative information. If the beacon 115 is in the same location, then the existing entry in the database may be updated at block 340 by the server 130 and/or the ticketing system 120. For example, the entry may include the new temperature of the beacon 115, the new signal strength of the beacon 115, the new battery power indication of the beacon 115, the new time stamp, and/or additional and/or alternative information. In some embodiments, the old information may be overwritten with the new information. In some embodiments, the old information may be maintained.

In some embodiments, the database of beacon activity may be monitored. For example, if the signal from a beacon 115 has not been received by a hub 110 or a user device 125 for a predetermined amount of time, it may be determined that the beacon 115 (and the item attached to the beacon 115) has departed the premises. The predetermined amount of time may be any suitable time amount such as an hour, a day, a week, a month, etc.

In some embodiments, the database of beacon activity may be used to keep track of the activity of items to which the beacons 115 are attached. For example, if the rollaway beds of a hotel are monitored using beacons 115, any rollaway bed that is within communication range of a hub 110 or a user device 125 may be located by identifying in the database where the hub 110 or the user device 125 is. In some embodiments, the database includes a table listing information related hubs 110, beacons 115, items to which the beacons 115 are attached, user devices 125, and/or additional and/or alternative information. For example, the table may list locations in which the hubs 110 are positioned, identification information of the beacons 115, which items are attached to respective beacons 115, battery levels of the beacons 115, signals strengths of the beacons 115, a history of which hubs 110 have received signals from the beacons 115, timestamps indicating when hubs 110 received signals from beacons 115, which hubs 110 are currently in communication with which beacons 115, locations of the beacons 115, locations of the items to which beacons 115 are attached, locations of the user devices 125, orders or actions associated with items to which the beacons 115 are attached (e.g., a tray having a beacon 115 is to be delivered to a hotel room), and/or any other information. The ticketing system 120 may retrieve and process information from the table of the database to track items and/or manage usage of the items.

For example, a computing device connected to the network 105 or the server 130 (or any other device that stores the database of beacon activity) may have a user interface that allows a user to view the location of various beacons 115 or the location history of beacons 115. In some embodiments, a user device 125 (such as a smartphone) may include a graphical user interface that may display information stored in the database of beacon activity. For example, a list of the beacons 115 (or a subset thereof) and their locations may be displayed on a screen of the user device 125. If a user selects one or more of the beacons 115 via a user interface (such as a touch screen), a history of the beacon 115 may be displayed. For example, the previous known locations of the selected beacon 115 may be displayed, the previous battery power levels, the previous signal strengths, etc. In some embodiments, the display may be used to display a plurality of hubs 110. If a hub 110 is selected, beacons 115 currently associated with the hub 110 (e.g., beacons 115 closest to the hub 110) may be displayed. For example, a hub 110 of a storage closet may be selected and the display may show which beacons 115 (and/or their associated items) are in the storage closet. In alternative embodiments, hubs 110 may be placed in any suitable room, location, or area that is to be monitored for beacons 115. For example, hubs 110 may be located in housekeeping yards of a hotel. In another example, each guest room of a hotel may have a hub 110.

In some instances, the amount of use of an item tagged with a beacon 115 may be determined based on the database of beacon activity. For example, if a rollaway bed is tagged with a beacon 115 and hubs 110 are located in every storage location that the rollaway bed may be stored, the amount of time that the beacon 115 of the rollaway bed is not in communication with a hub 110 may be the amount of time that the rollaway bed is checked out to customers. In another example, each room of a hotel may have one or more hubs 110. Thus, when the beacon 115 is closest to a hub 110 that is in a customer's room, it may be determined that the rollaway bed to which the beacon 115 is attached is checked out to a customer. Based on the amount of time (e.g., nights) checked out to customers, the remaining useful life of the mattress, the frame, etc. may be determined (e.g., approximated) and tracked.

In some embodiments, various components of a tagged item may be monitored and/or tracked. In some instances, each component of the item may be tagged. For instance, a maintenance cart may be tagged with a beacon 115 and multiple items on the maintenance cart such as tools, tool boxes, radios, equipment, etc. may also be tagged with respective beacons 115. In some such examples, the useful life of the individual items may be tracked individually. In some instances, only one beacon 115 may be used for an item with multiple components and the useful life of the multiple components may be tracked. For example, a rollaway bed may be tagged with a beacon 115. The rollaway bed may have a frame and a mattress that have different usable lives. The beacon 115 may be fixed to either the frame or the mattress. Because the mattress and the frame are likely to be paired together for an extended period, only one beacon 115 may be used for both the mattress and the frame. Thus, the frame and the mattress paired with the frame may each be associated with a single beacon 115 within item management system 100. The useful lives of the mattress and the frame may be distinguishable and tracked within item management system 100.

In some embodiments, the use of items over time may be monitored by analyzing information stored in the database of beacon activity. For example, the peak use of items may be determined. For example, rollaway beds may be tracked using beacons 115. Over the course of a year (or any other suitable timeframe, such as the life of the system), the maximum number of rollaway beds used at any one time may be determined. Thus, the peak use of rollaway beds may be determined. Such information may be used to inform a decision about the total number of rollaway beds a hotel should have in inventory.

In another example, the use of rollaway beds over the course of a year (or over several years) may be analyzed to determine a pattern of use. For example, it may be determined that rollaway beds are used more often in the fall than in the spring. Similarly, it may be determined in another hotel that more rollaway beds are used in the spring than in the fall. Such information may be used to manage inventory of rollaway beds. For example, the two hotels may share rollaway beds, thereby reducing the total inventory of rollaway beds between the two hotels.

In some embodiments, the system 100 described above may be used to prioritize the use of specific items. Using the rollaway beds example above, when a customer requests the use of a rollaway bed, the rollaway bed with the least amount of use may be identified using the database of beacon activity. The location of the least used rollaway bed may then be determined, and staff may let the customer use the rollaway bed with the least amount of use. Thus, the use of the rollaway beds may be spread (e.g., evenly) across all of the rollaway beds.

In some embodiments, the system 100 may be used to discriminate against the use of specific items. For example, a rollaway bed may be disfavored, but still usable. For example, the rollaway bed may be squeaky or missing a wheel. The maintenance crew for the hotel may have more pressing matters to attend to and the rollaway bed may not be fixed for a period of time. During the period of time, other rollaway beds may be checked out to customers before the disfavored rollaway bed. Such a system may be automated by the system 100. For instance, when a customer requests from a staff member a rollaway bed, the request may be input into the ticketing system 120, which may access the database of beacon activity to identify which rollaway bed a staff member is to take to the customer's room. Such a system may be implemented because each rollaway bed is tagged with a beacon 115 that has a unique identification code. Thus, instead of having multiple rollaway beds, any one of which may be used, the system may keep track of the use of each individual rollaway bed and treat the rollaway beds individually instead of as a group. Thus, any specific rollaway bed with a beacon 115 may be quickly identified and located, for example, for maintenance or for use. In some embodiments, when an item with a beacon 115 (e.g., a rollaway bed) is identified by a user (e.g., a staff member, a housekeeper, etc.) as requiring maintenance or being damaged, the user may enter such information into the ticketing system 120. The ticketing system 120 may generate a work order or otherwise notify (e.g., via user devices 125) maintenance personnel, engineers, etc. that the item requires work. The ticketing system 120 may, using the item management system described herein, indicate to the maintenance worker where the item is located.

As shown in FIG. 1, an item management system 100 may include a ticketing system 120. In some embodiments, the ticketing system 120 may be a management system for a business in the hospitality industry, such as a hotel, and/or any other business, building, area, etc. For example, the ticketing system 120 may include a service and/or housekeeping optimization system, such as HotSOS□, which is produced by Newmarket Int., Inc. The service optimization system may include user devices 125 and may assist in delegating tasks to employees. For example, if customers in a room of a hotel request fresh pillows, the ticketing system 120 may indicate to one or more employees of the customer's request.

In some embodiments, the ticketing system 120 may use the database of beacon activity. For example, if a customer of a hotel requests a rollaway bed, such a request may be entered into the ticketing system 120. In response to the request, an employee may receive a task via user device 125 to take a specific rollaway bed (tagged with a beacon 115), which is located at a specific location indicated in the database of beacon activity, to the customer's room. The system may identify which rollaway bed to take based on the total use of the rollaway beds (or any other suitable consideration).

For example, one or more user devices 125 may be located in guest rooms of a hotel. The user devices 125 in the guest rooms may include, for example, a tablet such as an iPad® manufactured by Apple Inc. In such an example, the guests may use the tablet to communicate with hotel staff (e.g., request room service meals, request towels, request a rollaway bed, make a complaint, etc.) via ticketing system 120. The tablets may also be used to order movies, dim the lights, etc. In some embodiments, the tablet is used to track beacons 115. That is, the tablet (e.g., user device 125) may be confined (or assigned) to a guest's room. When a beacon 115 enters the room (e.g., a dinner tray, a rollaway bed, etc.), the tablet may indicate to the server 130 and/or the ticketing system 120 that the beacon 115 is in the guest's room. In such an embodiment, when the guest is finished with the item with the beacon 115, the guest may place the tagged item into the hallway. As described above, the system 100 may determine, based on signal strength of the beacon 115, that the beacon 115 is no longer in the guest's room and is ready to be picked up by hotel staff. Further, in some embodiments, the tablets of each room may themselves have a beacon 115. The beacon 115 of the tablets may be used to track the location of the tablets to protect against theft and/or unauthorized use (e.g., in a pool area).

In another example, the ticketing system 120 may be used to manage operations of the hotel. When a guest checks out of a hotel, the ticketing system 120 may identify items with a beacon 115 that should be removed from the guest's room and where the items should be stored. For example, when a guest checks out, a notification may be sent from the ticketing system 120 to one or more user devices 125 indicating to one or more staff members that the guest's room is ready to be prepared for the next guest. The staff member responsible for preparing the room may receive a list of items tagged with beacons 115 that are to be removed from the room (or otherwise prepared for the next guest). For instance, a user device 125 may indicate to the staff member that a rollaway bed, a crib, and a refrigerator are to be removed. In some embodiments, the user device 125 may indicate where each item is to be stored. In some embodiments, after the staff member stores each item, the staff member may enter information indicating such into the user device 125, and such information may be transmitted to the server 130 and/or ticketing system 120. In such an embodiment, the staff member may use the user device 125 to indicate where each item is stored (e.g., which closet, which wing of the building, which floor, etc.). In some embodiments, the items may be tagged with beacons 115 and, as described above, the system 100 may track where each item is stored by the staff member and when each item is put away.

In some embodiments, the location history of beacons 115 is used with information of the ticketing system 120. For example, damage may be noticed on an item to which a beacon 115 is fixed, and the location history of the beacon 115 may be used with a reservation history of the ticketing system 120 to determine which guests the item was issued to. For example, the location history of the beacon 115 may indicate that the item was last issued to room X on June 16 and the reservation history may indicate which guest was staying in room X on June 16.

In some embodiments, the ticketing system 120 may schedule a user (e.g., hotel staff) to remove an item from a guest's room based on a guest's scheduled departure date. The reservation information (including departure date, check-out time, etc.) of guests may be stored in the server 130 and/or the ticketing system 120. As mentioned above, in some embodiments, beacons 115 on rollaway beds may indicate to the item management system 100 whether the rollaway bed is made. In some embodiments, the server 130 and/or the ticketing system 120 may include a date that the rollaway bed is made. In such embodiments, if the rollaway bed is to be delivered to a guest and the rollaway bed was made longer than a predetermined time threshold ago (e.g., two weeks), the ticketing system 120 may receive an indication that the rollaway bed is to be delivered to a guest and issue a work order or notify a user (e.g., a housekeeper) that the rollaway bed is to be re-made.

In some embodiments, guest profiles may be stored within item management system 100, for example within ticketing system 120. Each guest profile may include identification information and historical data on the guest. The historical data may include, which hotels the guest has stayed at, which hotel brands the guest has stayed at, what size room the guest has reserved, who the guest has stayed with (e.g., a spouse, children, etc.), etc. In some embodiments, the guest profile may include guest preference information, such as a preferred room size, a preferred hotel brand, preferred hotel amenities (e.g., a pool, a work station, a gym), etc. In some embodiments, information from ticketing system 120 and/or the server 130 may be used to populate and/or supplement guest profile information. For example, the guest profile may include an indication that the guest requested a service of the hotel during a previous visit. Such information may be used in a later visit of the guest to a hotel. For instance, a guest may be staying in a hotel in New Orleans, La., with his wife and, during the stay, the guest may request a crib. The guest may also have reserved a room a month later in Hong Kong with his wife. It may be predicted based on the guest's past request, for example by ticketing system 120, that the guest will request a crib during his stay in Hong Kong even if the guest's reservation does not include such a request. In such an example, the ticketing system 120 may identify a crib with a beacon 115 attached and request, via a user device 125, a user to prepare the crib for the guest.

Figure 4:
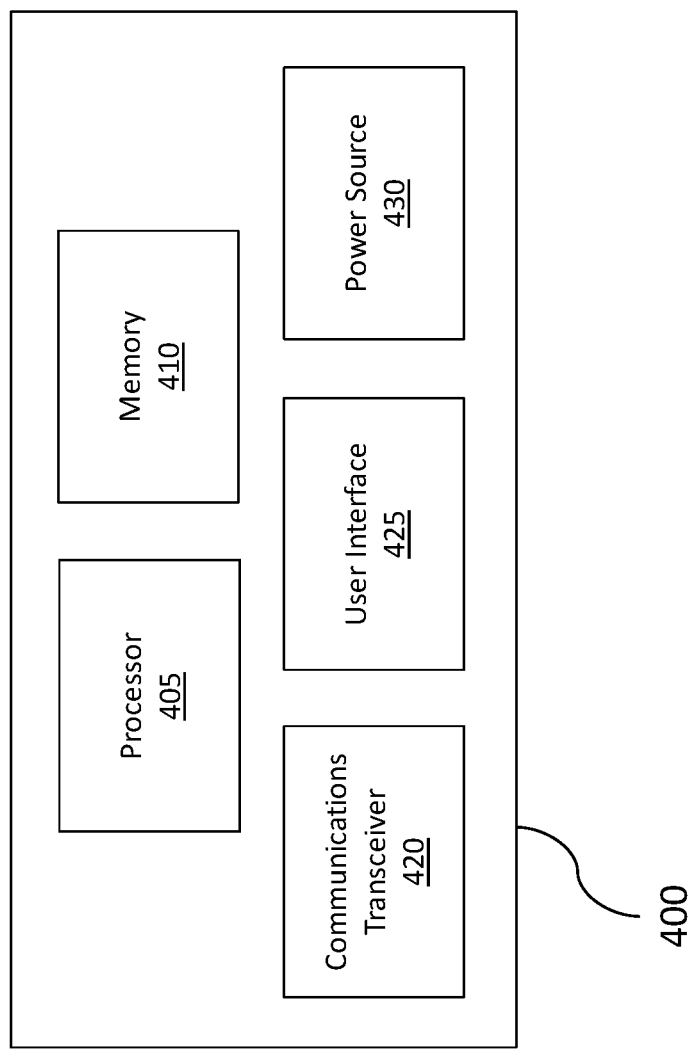
FIG. 4 is a block diagram of a computing device in accordance with the teachings of this disclosure.

FIG. 4 is a block diagram of an example computing device 400 disclosed herein. In some embodiments, the computing device includes additional, fewer, and/or different components. The computing device 400 includes a processor 405, a memory 410, a communications transceiver 420, a power source 430, and a user interface 425. The item management system 100 may include one or more computing devices 400. For example, the computing device 400 may be used to implement one or more of the hubs 110, user devices 125, the server 130, and/or the ticketing system 120.

In the illustrated embodiment, computing device 400 may include processor 405. Processor 405 may be configured to carry out and/or cause to be carried out one or more machine readable instructions described herein such as, for example, the machine readable instructions illustrated in FIGS. 2, 3, and/or 10-12. Processor 405 may execute instructions. The instructions may be carried out by one or more special purpose computers, logic circuits (e.g., programmable logic circuits (PLC)), and/or hardware circuits. Thus, processor 405 may be implemented in hardware, firmware, software, or any combination of these methods. The term "execution" is the process of running an application or the carrying out of the operation called for by an instruction. The instructions may be written using one or more programming languages, scripting languages, assembly languages, etc. Processor 405 executes an instruction, meaning that it performs the operations called for by that instruction. Processor 405 operably couples with memory 410, communications transceiver 420, power source 430, user interface 425, etc. to receive, to send, and to process information and to control the operations of the computing device 400. Processor 405 may retrieve a set of instructions from a permanent memory device such as a read-only memory (ROM) device and copy the instructions in an executable form to a temporary memory device that is generally some form of random access memory (RAM). Computing device 1200 may include a plurality of processors that use the same or a different processing technology. In some embodiments, the instructions may be stored in memory 410.

In some embodiments, computing device 400 may include memory 410. Memory 410 may be an electronic holding place or storage for information so that the information may be accessed by processor 1205 using any suitable method. Memory 410 may include, but is not limited to, any type of random access memory (RAM), any type of read-only memory (ROM), any type of flash memory, etc. such as magnetic storage devices (e.g., hard disk, floppy disk, magnetic strips, etc.), optical disks (e.g., compact disk (CD), digital versatile disk (DVD), etc.), smart cards, flash memory devices, etc. Computing device 400 may have one or more computer-readable media that use the same or a different memory media technology. Computing device 400 may have one or more drives that support the loading of a memory medium such as a CD, a DVD, a flash memory card, etc.

In the illustrated embodiment, the computing device 400 includes a communications transceiver 420. Communications transceiver 420 may be configured to receive and/or transmit information. In some embodiments, communications transceiver 420 may communicate information via a wired connection, such as an Ethernet connection, one or more twisted pair wires, coaxial cables, fiber optic cables, etc. In some embodiments, communications transceiver 420 may communicate information via a wireless connection using microwaves, infrared waves, radio waves, spread spectrum technologies, satellites, etc. Communications transceiver 420 may be configured to communicate with another device using cellular networks, local area networks, wide area networks, the Internet, etc. In some embodiments, one or more of the elements of computing device 400 communicate via wired or wireless communications.

In the illustrated embodiment, the computing device 400 includes a power source 430. Power source 430 may be configured to provide electrical power to one or more elements of computing device 400. In some embodiments, power source 430 may include an alternating power source, such as available line voltage (e.g., 120 Volts (V) alternating current at 60 Hertz in the United States). Power source 430 may include one or more transformers, rectifiers, etc. to convert electrical power into power useable by the one or more elements of computing device 400, such as 1.5 V, 8 V, 12 V, 24 V, etc. Power source 430 may include one or more batteries.

In some embodiments, computing device 400 includes a user interface 425. User interface 425 may be configured to receive and/or provide information from/to a user. User interface 425 may be any suitable user interface. User interface 425 may be an interface for receiving user input and/or machine readable instructions for entry into computing device 400 using any suitable method. User interface 425 may use various input technologies including, but not limited to, a keyboard, a stylus and/or touch screen, a mouse, a track ball, a keypad, a microphone, voice recognition, motion recognition, disk drives, remote computing devices, input ports, one or more buttons, dials, joysticks, etc. to allow an external source, such as a user, to enter information into computing device 400. User interface 425 may be used to navigate menus, adjust options, adjust settings, adjust display, etc. User interface 425 may be configured to provide an interface for presenting information from computing device 400 to external systems, users, or memory. For example, user interface 425 may include an interface for a display, a printer, a speaker, alarm/indicator lights, a network interface, a disk drive, a computer memory device, etc. User interface 425 may include a color display, a cathode-ray tube (CRT), a liquid crystal display (LCD), a plasma display, an organic light-emitting diode (OLED) display, etc.

The methods 300, 400 disclosed herein are representative of machine readable instructions that may be performed, for example, by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations, of the foregoing. The apparatus may include special purpose logic circuitry, e.g., an FPGA (field programmable gate array) or an ASIC (application-specific integrated circuit). The apparatus may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing and/or grid computing infrastructures.

A computer program (also known as a program, software, software application, script, or code) may be written in any form of programming language, including compiled or interpreted languages, declarative or procedural languages, and it may be deployed in any form, including as a standalone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and an I/O device, e.g., a mouse or a touch sensitive screen, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Embodiments of the subject matter described in this specification may be implemented in a computing system that includes a back-end component, e.g., as a data server, or that includes a middleware component, e.g., an application server, or that includes a front-end component, e.g., a client computer having a graphical user interface or a web browser through which a user may interact with an implementation of the subject matter described in this specification, or any combination of one or more such back-end, middleware, or front-end components. The components of the system may be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system may include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) may be received from the client device at the server.

Figure 5:
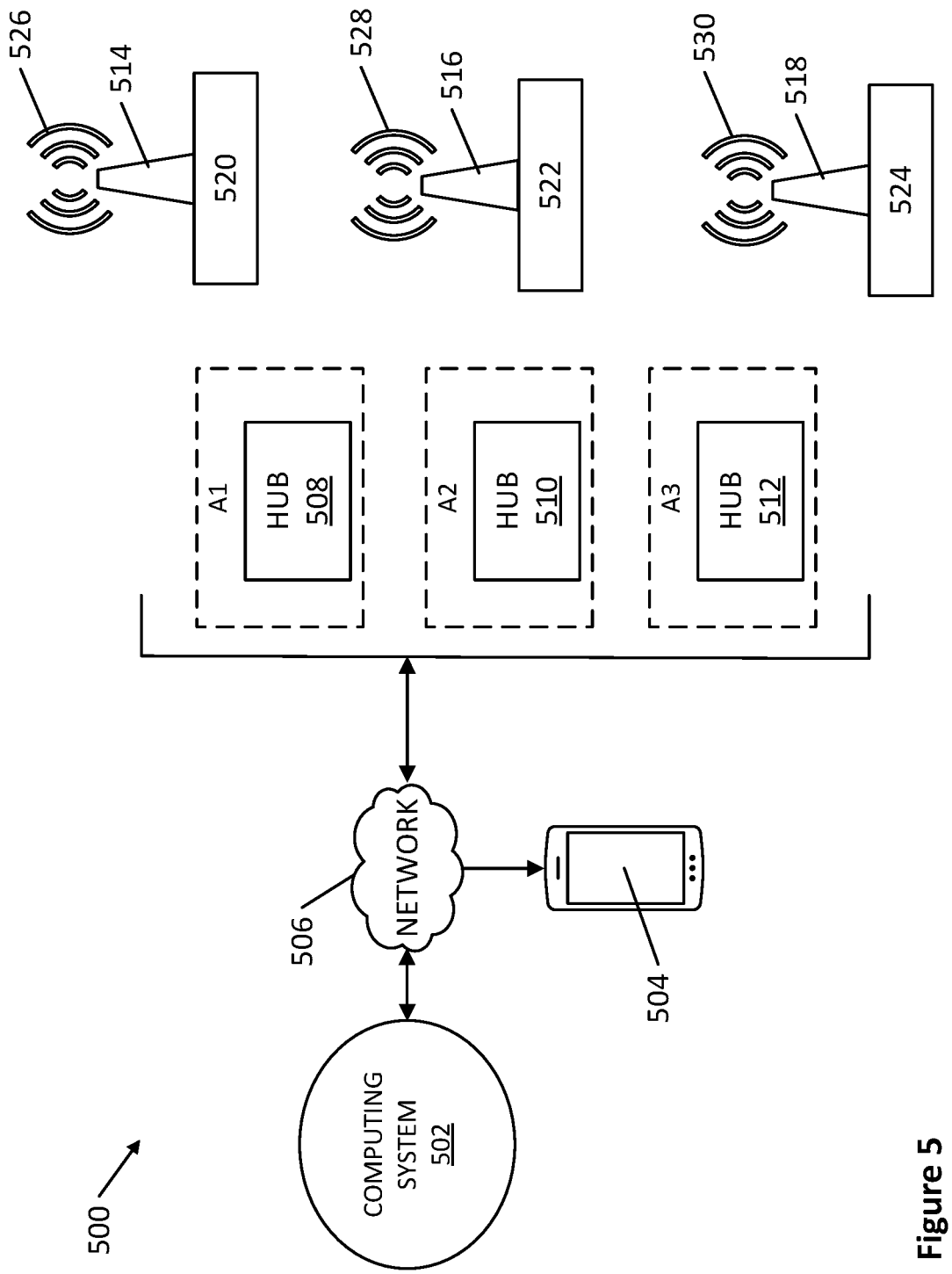
FIG. 5 illustrates another example item management system disclosed herein.

FIG. 5 illustrates another example item management system 500 disclosed herein. In the illustrated embodiment, the item management system 500 includes a computing system 502 and a user device 504. The computing system 502 is in communication with the user device 504 via a network 506. The item management system 500 of FIG. 5 also includes a first hub 508, a second hub 510, a third hub 512, a first beacon 514, a second beacon 516, and a third beacon 518. Although the example item management system 500 of FIG. 5 includes three hubs and three beacons, in other examples, the item management system 500 may include other numbers of hubs and/or beacons. For example, the item management system 500 may include 10 hubs, 50 hubs, 100 hubs, 1000 hubs, 5 beacons, 50 beacons, 100 beacons, 1000 beacons, and/or any suitable number hubs and/or beacons.

The network 506 may be any suitable communications network. The network 506 may include wired and/or wireless communications. The network 506 may include a local area network (LAN), a wide area network (WAN), a mobile communications network (e.g., a cellular network), the Internet, etc. In some embodiments, the network 506 may include a LAN that is connected to the Internet. The network 506 may use any suitable communications protocols.

The user device 504 may be any suitable communications device that communicates with the network 506. The user device 504 may be substantially identical to the user devices 125 of FIG. 1. For example, the user device 504 may be a computer, a laptop, a smart device such as a smart phone, a tablet, and/or any other suitable user device. In some embodiments, the user device 504 is configured to communicate with the network 506, the hubs 508, 510, 512, and/or the beacons 514, 516, 518. As described in greater detail below, information related to the hubs 508, 510, 512 and/or the beacons 514, 516, 518 may be communicated from the computing system 502 to the user device 504 via the network 506 and/or from the user device 504 to the computing system 502 via the network 506.

In some embodiments, the hubs 508, 510, 512 of FIG. 5 are substantially identical to the hubs 110 of FIG. 1 and, thus, may be implemented using the computing device 400 of FIG. 4. In some embodiments, the hubs 508, 510, 512 are implemented using, for example, wireless receivers sold by Beijing Aprilbrother Techology Co. In the illustrated embodiment, the hubs 508, 510, 512 are in communication with the computing system 502 via the network 506. In some embodiments, the hubs 508, 510, 512 are in communication with the network 506 via Wi-Fi and/or any other suitable wired and/or wireless communications.

The hubs 508, 510, 512 may also be in communication with one or more of the first beacon 514, the second beacon 516, and/or the third beacon 518 via wireless communications such as, for example, near field communication (NFC), Bluetooth® (Bluetooth® low energy (BLE), Bluetooth® Smart, or any other version of Bluetooth® technology), ZigBee®, IEEE® standard 802.11, and/or any other wireless communication. In some embodiments, each of the hubs 508, 510, 512 is configured to detect and/or determine a strength of wireless signals received by the hubs 508, 510, 512 from the beacons 514, 516, 518.

In the illustrated embodiment, the hubs 508, 510, 512 are fixed relative to Earth (e.g., coupled to a stationary item or object such as a wall, a floor, a shelf, and/or any other stationary item or object). In other embodiments, one or more of the hubs 508, 510, 512 may be fixed to a movable object, such as a cart, a chair, and/or any other movable object. In other embodiments, the hubs 508, 510, 512 are not coupled or fixed to an item or object. In the illustrated embodiment, the first hub 508 is associated with a first area A1. The second hub 510 is associated with a second area A2. The third hub is associated with a third area A3. For example, the first area A1 may be a first hotel room, the second area A2 may be a second hotel room, and the third area A3 may be a third hotel room. However, the above-noted areas are merely examples. In other embodiments, the first area A1, the second area A2, and/or the third area A3 may be any suitable area such as a portion of a room (e.g., a closet), a lobby, a kitchen, a section of a building (e.g., a basement), a balcony, a shed, a 10 cubic feet area, 100 cubic feet area, a plot of land, and/or any other suitable area.

The beacons 514, 516, 518 of FIG. 5 may be substantially identical to the beacons 115 of FIG. 1 and, thus, may be implemented using the computing device 400 of FIG. 4. In the illustrated embodiment, first beacon 514 is associated with a first item 520. The second beacon 516 is associated with a second item 522. The third beacon 518 is associated with a third item 524. The first item 520, the second item 522, and the third item 524 may be any movable or portable object or thing such as, for example, a cart, a microwave, a television, a vacuum, a piece of machinery (e.g., a jackhammer, a bulldozer, etc.) and/or any other item.

In the illustrated embodiment, the beacons 514, 516, 518 are in communication with one or more of the hubs 508, 510, 512. For example, the beacons 514, 516, 518 may each generate wireless communication signals via, for example, near field communication (NFC) Bluetooth® (Bluetooth® low energy (BLE), Bluetooth® Smart, or any other version of Bluetooth® technology), ZigBee®, IEEE® standard 802.11, and/or any other wireless communications, which are received by one or more of the hubs 508, 510, 512. In some embodiments, the wireless communications employ wireless signals that propagate along multiple paths such as Bluetooth® or radio signals. In some embodiments, each of the beacons 514, 516, 518 generates wireless communication signals of a predetermined signal strength.

In the illustrated embodiment, the first beacon 514 periodically communicates a first wireless signal 526. The second beacon 516 periodically communicates a second wireless signal 528. The third beacon, 518 periodically communicates a third wireless signal 530. For example, the first beacon 514, the second beacon 516, and the third beacon 518 may generate the first wireless signal 526, the second wireless signal 528, and the third signal 530, respectively, every one second, every five seconds, every eight seconds, every ten seconds, and/or at any other rate of occurrence. The wireless signals 526, 528, 530 include information related to the respective beacons 514, 516, 518.

For example, the first wireless signal 526 includes first beacon information such as identification information, information related to a signal strength of the first wireless signal 526, information related to the item 520 to which the first beacon 514 is coupled, and/or additional and/or alternative information. In some embodiments, the identification information includes a first Universally Unique Identifier (UUID) of the first beacon 514, a first Major value or integer of the first beacon 514, a first Minor value or integer of the first beacon 514, and/or additional and/or alternative identification information. In some embodiments, the first major value corresponds to a group of beacons such as, for example, a group of beacons coupled to a type of item. For example, in a hotel, all beacons coupled to vacuum cleaners may have the same or similar major value. In some embodiments, the minor value may correspond to a subset of the group of beacons or only one beacon. In other embodiments, the first major value and/or the first minor value identify the first beacon 514 in one or more additional and/or alternative ways.

In some embodiments, the beacon information includes a first predetermined signal strength indicator such as, for example, a Measured Signal-to-Noise Ratio (SNR) of the first beacon 514, a transmission power, a signal strength indicator that is a function of the Measured SNR and/or the transmission power, and/or any other predetermined signal strength indicator. In some embodiments, predetermined signal strength indicators indicate a predetermined signal strength of a wireless signal. For example, a Measured Power or SNR may be an experimentally determined or theoretical signal strength of a wireless signal generated by a beacon and detected by a hub or other device a predetermined distance (e.g., one meter) away from the beacon. In some embodiments, the transmission power is a power at which the first beacon 514 is configured to transmit the first signal 516. Thus, the Measured Power or SNR is a function of the transmission power.

The second wireless signal 528 includes second beacon information such as identification information, information related to a signal strength of the second wireless signal 528, information related to the second item 522 to which the second beacon 516 is coupled, and/or additional and/or alternative information. In some embodiments, the identification information includes a second Universally Unique Identifier (UUID) of the second beacon 516, a second Major value or integer of the second beacon 516, a second Minor value or integer of the second beacon 516, and/or additional and/or alternative identification information. In some embodiments, the second beacon information includes a second predetermined signal strength indicator (e.g., a Measured Signal-to-Noise Ratio (SNR) of the second beacon 516, a transmission power at which the second beacon 516 is configured to transmit the second wireless signal 528, a signal strength indicator that is a function of the measured SNR and/or the transmission power), and/or any other suitable information.

The third wireless signal 530 includes third beacon information such as identification information, information related to a signal strength of the third wireless signal 530, information related to the third item 524 to which the third beacon 518 is coupled, and/or additional and/or alternative information. In some embodiments, the identification information includes a third Universally Unique Identifier (UUID) of the third beacon 518, a third Major value or integer of the third beacon 518, a third Minor value or integer of the third beacon 518, and/or additional and/or alternative identification information. In some embodiments, the third beacon information includes a third predetermined signal strength indicator (e.g., a Measured Power or Signal-to-Noise Ratio (SNR) of the third beacon 518, a transmission power at which the third beacon 518 is configured to transmit the third wireless signal 530, a signal strength indicator that is a function of the Measured SNR and/or the transmission power), and/or any other suitable information.

Figure 6:
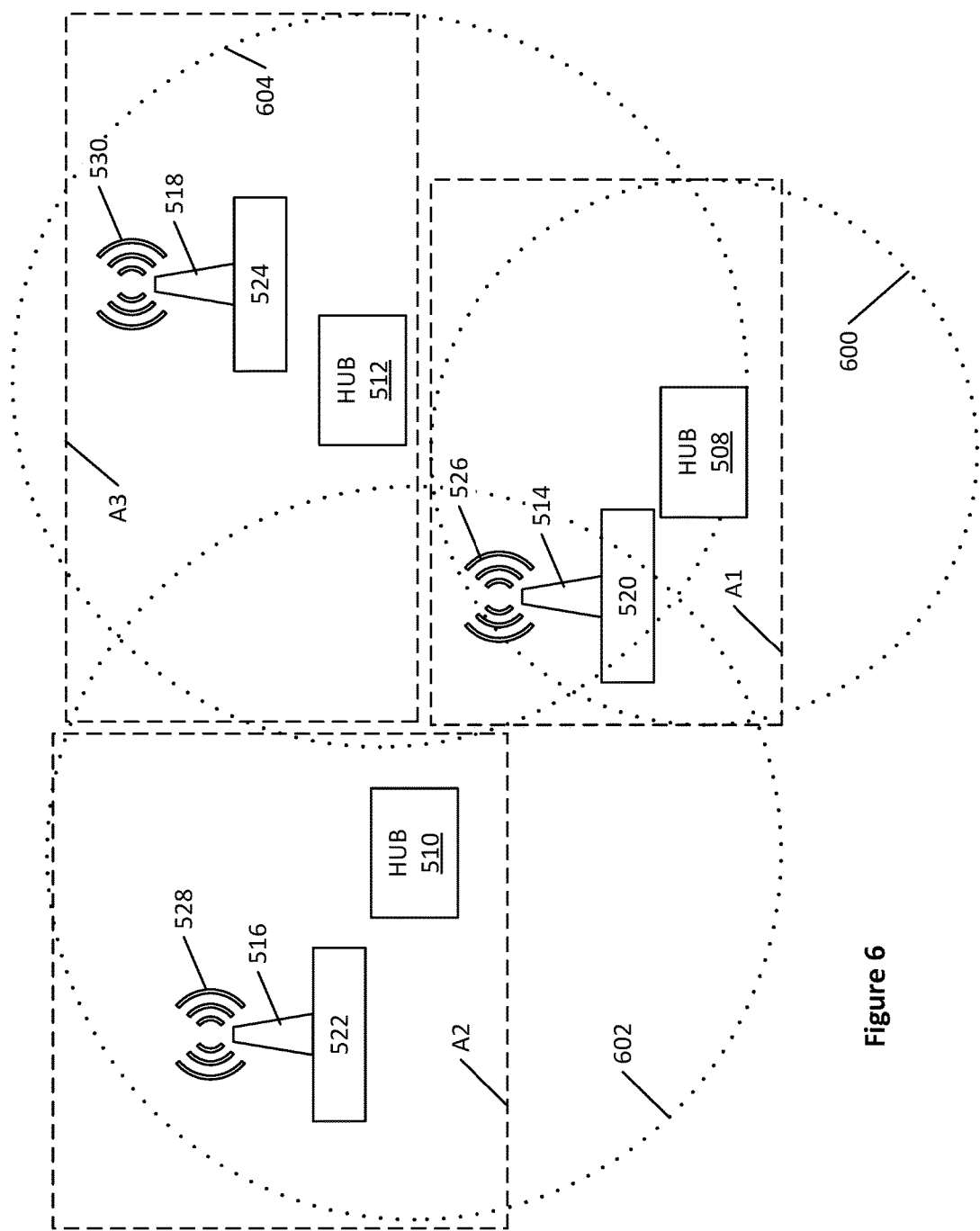
FIG. 6 illustrates an example layout of hubs and the beacons of the example item management system of FIG. 5.

FIG. 6 illustrates an example layout of the hubs 508, 510, 512 and the beacons 514, 516, 518. Each of the hubs 508, 510, 512 has a predetermined receiving or listening range. In some embodiments, the hubs 508, 510, 512 may be configured to enable listening ranges of the hubs 508, 510, 512 to be adjusted to extend a predetermined distance from the hubs 508, 510, 512 and/or cover a predetermined area surrounding the hubs 508, 510, 512 and, thus, set listening ranges of the hubs 508, 510, 512 to predetermined listening ranges.

For example, in the illustrated embodiment, the first hub 508 includes a first receiving or listening range 600. The first receiving or listening range 600 may be set to extend a predetermined distance from the first hub 508 and/or cover a predetermined area surrounding the first hub 508. For example, the first hub 510 may be located in or near a center of a hotel room. A listening range of the first hub 510 may be adjusted to the first listening range 600 such that the first listening range 600 extends to one or more edges of the hotel room, covers a desired portion of the hotel room, covers the entire hotel room, extends into a hallway outside of the hotel room, and/or extends to and/or covers any other desired distance and/or area. The second hub 510 includes a second receiving or listening range 602. The second receiving or listening range 602 may be set to extend a predetermined distance from the second hub 510 and/or cover a predetermined area surrounding the second hub 510. The third hub 512 includes a third receiving or listening range 604. The third receiving or listening range 604 may be set to extend a predetermined distance from the third hub 512 and/or cover a predetermined area surrounding the third hub 512.

In some embodiments, the first listening range 600, the second listening range 602, and/or the third listening range 604 are substantially equal. In other embodiments the first listening range 600, the second listening range 602, and/or the third listening range 604 are different. For example, the first listening range 600 may be an area surrounding the first hub 508 that has a radius of 30 feet from the first hub 508. The second listening range 602 may an area surrounding the second hub 510 having a radius of 50 feet from the second hub 510. The third listening range 604 may be an area surrounding the third hub 512 having a radius of 65 feet from the third hub 512. The above-noted listening ranges are merely examples and, thus, other listening ranges may be employed without departing from the scope of this disclosure.

In the illustrated embodiment, portions of the first listening range 600, the second listening range 602, and the third listening range 604 overlap. Thus, in some embodiments, the beacons 514, 516, 518 may be in communication with two or more of the hubs 508, 510, 512. In the illustrated embodiment, the first beacon 514 is within the first listening range 600, the second listening range 602, and the third listening range 604. As a result, the first wireless signal 526 generated by the first beacon 514 is receivable by the first hub 508, the second hub 510, and the third hub 512. Thus, the first beacon 514 is in communication with the first hub 508, the second hub 510, and the third hub 512. If, for example, the first beacon 514 is moved outside of the first receiving or listening range 600, the first wireless signal 526 generated by the first beacon 514 is not receivable by the first hub 508 and, thus, the first hub 508 is not in communication with the first beacon 514. In the illustrated embodiment, the second beacon 516 is within only the second listening range 602 of the second hub 510. The third beacon 518 is within only the third listening range 604 of the third hub 512. As described in greater detail below, the computing system 502 assigns each of the beacons 514, 516, 518 to only one of the hubs 508, 510, 512 to enable a user to track and/or manage the beacons 514, 516, 518.

The hubs 508, 510, 512 communicate information related to the beacons 514, 516, 518 and/or the hubs 508, 510, 512 to the network 506. For example, when the first hub 508 receives the first wireless signal 526, the first hub 508 communicates some or all of the first beacon information in the first wireless signal 526 and/or additional and/or alternative information to the computing system 502 via the network 506. For example, in some embodiments, in response to receiving the first wireless signal 526, the first hub 508 communicates the first beacon information and/or any other suitable information.

As described in greater detail below, the computing system 502 determines locations of the beacons 514, 516, 518, and thus, the items 520, 522, 524, based on the information communicated from the hubs 508, 510, 512. In some embodiments, the computing system 502 determines additional and/or alternative information related to the beacons 514, 516, 518 and/or the items 520, 522, 524 based on the information communicated from the hubs 508, 510, 512. For example, the computing system 502 of FIG. 5 may determine an availability of the first item 520, the second item 522 and/or the third item 524 (e.g., whether or not one of the items 520, 522, 524 is being used by a hotel guest); amounts of useful life remaining of the first item 520, the second item 522 and/or the third item 524; a status or state (e.g., battery level) of the first beacon 514, the second beacon 516, and/or the third beacon 518, and/or any other additional and/or alternative information. The computing system 502 may communicate the locations and/or the additional and/or alternative information to the user device 504 via the network 506 to enable a user to track the items 520, 522, 524 and/or manage use of the items 520, 522, 524.

Figure 7:
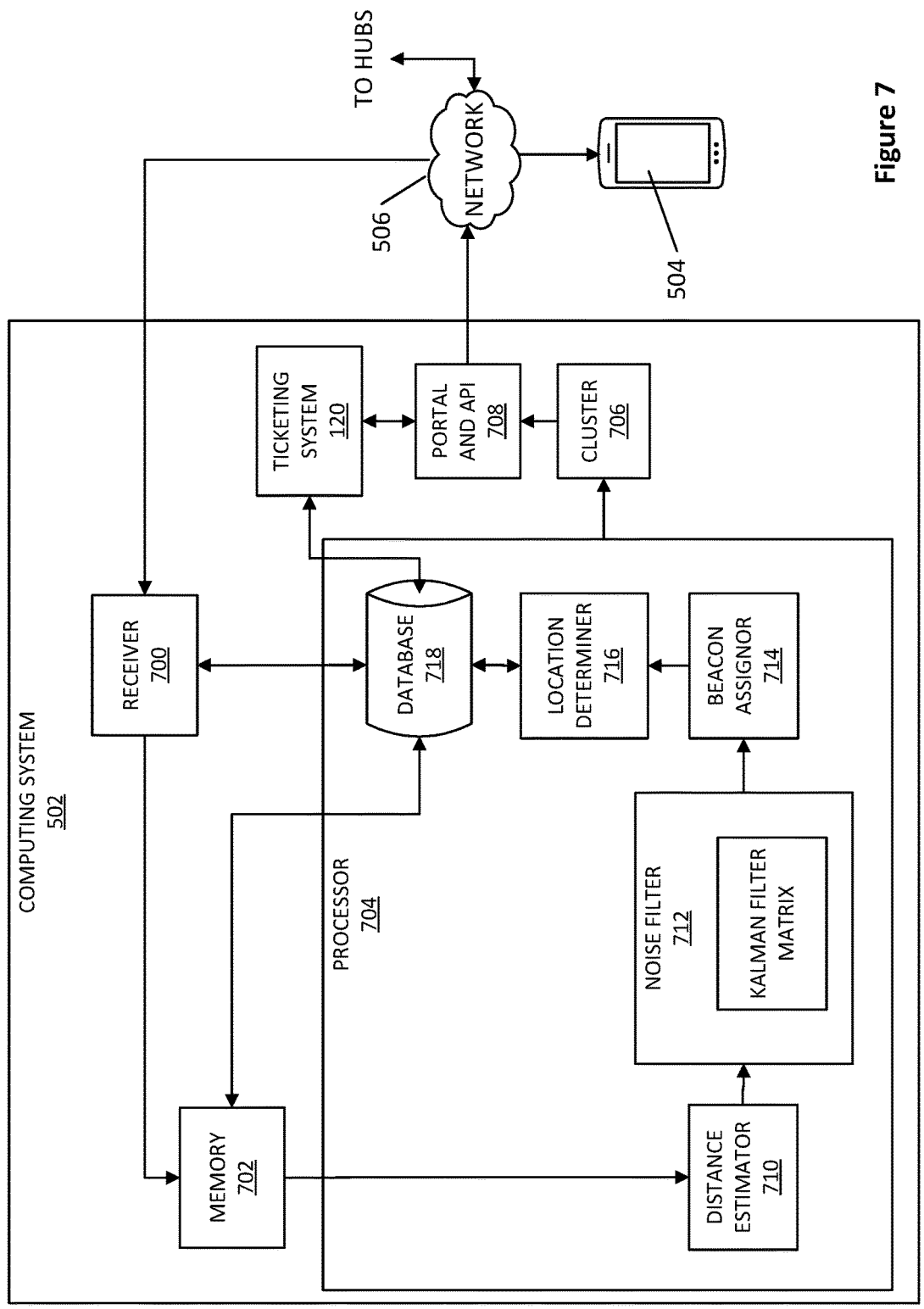
FIG. 7 illustrates an example computing system of the example item management system of FIG. 5.

FIG. 7 is a block diagram of the example computing system 502 of FIG. 5. In the illustrated embodiment, the computing system 502 is a cloud computing system which may be implemented via, for example, a cloud computing system sold under the name Microsoft Azure®. The computing system 502 includes a receiver 700, a memory 702, a processor 704, a cluster 706, a portal 708, and the ticketing system 120. The receiver 700 may be implemented via a Message Queue Telemetry Transport (MQTT) Broker. In some embodiments, the memory 702 is a cache such as a cache sold under the name Redis Cache. In other embodiments, the memory one or more additional and/or alternative types of memory such as, for example, a hard disk drive, a flash memory, a read-only memory, a compact disk, a digital versatile disk, a random-access memory, etc. In some embodiments, the processor 704 is implemented via one or more virtual machines. The cluster 706 may be implemented via a cluster sold under the name of MySQL™ Cluster. The portal 708 may include an application programming interface (API) and may enable management of web applications, databases, virtual machines, virtual networks, data storage, and/or one or more additional and/or alternative aspects and/or components of the computing system 502. The ticketing system 120 may be substantially similar or identical to the example ticketing system of FIG. 1.

In the illustrated embodiment, the processor 704 includes a distance estimator 710, a noise filter 712, a beacon assignor 714, a location determiner 716, and a database 718. The receiver 700 of FIG. 7 receives information from hubs 508, 510, 512 via the network 506 and queues the information into the memory 702. The processer 704 retrieves the information, and the distance estimator determines an estimated distance between the hubs 508, 510, 512 and the beacons 514, 516, 518. In some embodiments, database 718 is a database of beacon activity as described in connection with FIGS. 1-4 above. In some embodiments, the memory 702 includes the database 718.

The following description is provided in the context of the first hub 508 and the first beacon 514. However, the following description is applicable to any combination of the first hub 508, the second hub 510, or the third hub 512 and the first beacon 514, the second beacon 516, or the third beacon 518. For example, even though the first hub 508 and the first beacon 514 are described below, substantially the same description is applicable to the first hub 508 and the second beacon 516, the first hub and the third beacon 518, the second hub 510 and the first beacon 514, the second hub 510 and the second beacon 516, the second hub 510 and the third beacon 518, the third hub 512 and the first beacon 514, the third hub 512 and the second beacon 516, and the third hub 512 and the third beacon 518.

When the first beacon 514 is within the first listening range 600 of the first hub 508, the first beacon 514 generates the first wireless signal 526, and the first hub 508 receives the first wireless signal 526. The first wireless signal 526 may include the first beacon information that includes, for example, the first Universally Unique Identifier (UUID) of the first beacon 514, the first Major value or integer of the first beacon 514, the first Minor value or integer of the first beacon 514, the first predetermined signal strength indicator (e.g., a Measured Signal-to-Noise Ratio (SNR) a transmission power, and/or a function of the Measured Power or SNR and/or the transmission power) of the first beacon 514, and/or any other suitable information.

The first hub 508 detects a first signal strength of the first wireless signal 526 received by the first hub 508. In some embodiments, the first signal strength is a received signal strength indicator (RSSI). The first hub 508 communicates the first signal strength and the first beacon information to the computing system 502 via the network 506. For example, if the first wireless signal 526 is a Bluetooth® signal and the network 506 is the internet, the first hub 508 receives the first wireless signal 526 and translates the first wireless signal 526 to Transmission Control Protocol/Internet Protocol (TCP/IP) to communicate the first beacon information and the first signal strength to the receiver 700 via the internet. The receiver 700 then queues the first beacon information and the first signal strength in the memory 702. In some embodiments, the memory 702 includes one or more tables listing information related to the beacons 514, 516, 518, the hubs 508, 510, 512, and/or the items 520, 522, 524 employed by the example item management system 500 of FIGS. 5-7. The first beacon information, the first signal strength, and/or additional and/or alternative information (e.g., identification information related to the first item 520, information related to the first area A1, etc.) may be associated with the first beacon 514, the first hub 508, and/or the first item 520 via the table.

The distance estimator 710 determines a first estimated distance between the first hub 508 and the first beacon 514. In some embodiments, the distance estimator 710 determines the first estimated distance based on the first signal strength and the first predetermined signal strength indicator (e.g., a Measured Signal-to-Noise Ratio (SNR) a transmission power, and/or a function of the Measured SNR and/or any other signal strength indicator). For example, in some embodiments, the distance estimator 710 determines the first estimated distance using Equation 1 below:

$$\text{Estimated Distance} = 10^{\left(\frac{(TxP-RSSI)}{10n}\right)}, \quad (1)$$

where TxP is Measured Power or SNR measured in decibel-milliwatts (dBm), RSSI is a Received Signal Strength Indicator measured in dBm, and n is a wave constant of a signal. The above-noted equation is merely an example and, thus, in other embodiments, the first estimated distance may be determined using other equations, techniques, algorithms, etc.

Figure 8:
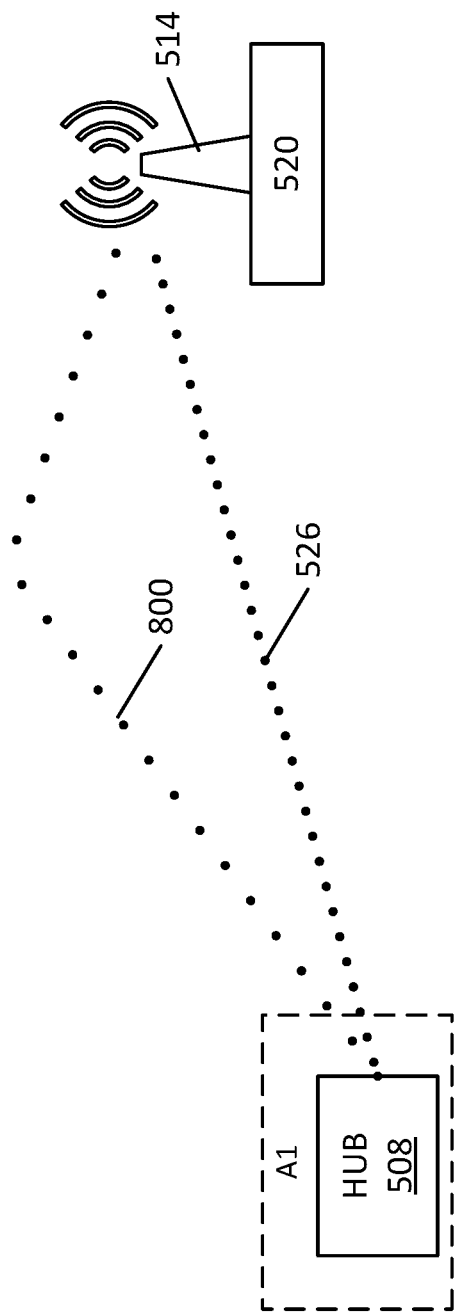
FIG. 8 illustrates multipath propagation of a wireless signal generated by one of the beacons of FIG. 6.

Referring to FIG. 8, in some embodiments, multipath propagation of the first wireless signal 526 generates one or more ghost signals that are received by the first hub 508. For example, the first wireless signal 526 may take multiple paths to the first hub 508 if the first wireless signal 526 bounces off objects, walls, and/or other structures and/or travels through different mediums (e.g., air, water, glass, walls, etc.). As a result, when the first beacon 514 generates the first wireless signal 526, the first hub 508 may receive the first wireless signal 526 via a first path and a first wireless ghost signal 800 of the first wireless signal 526 via a second path different than the first path. The first wireless ghost signal 800 mirrors or echoes the first wireless signal 526 and, thus, includes the first beacon information. The first hub 508 may detect that the first wireless signal 526 has the first signal strength and that the first wireless ghost signal 800 has a second signal strength different than the first signal strength. Thus, as a result of the multipath propagation of the first wireless signal 526, the first hub 508 communicates the first beacon information and the first signal strength to the computing system 502 in response to receiving the first wireless signal 526. In some embodiments, the first beacon information and the first signal strength are stored in the memory 702 and then retrieved by the distance estimator 710. The distance estimator 710 determines the first estimated distance between the first hub 508 and the first beacon 514 based on the first beacon information and the first signal strength.

In addition, the first hub 508 communicates the first beacon information and the second signal strength to the computing system 502 in response to receiving the first wireless ghost signal 800. The distance estimator 710 then determines a second estimated distance between the first hub 508 and the first beacon 514 based on the first beacon information and the second signal strength. However, the second estimated distance may be inaccurate if a difference between the first signal strength and the second signal strength results from a difference between the first path and second path. As a result, the distance estimator may determine estimated distances between the first hub 508 and the first beacon 514 that are indicative of movement of the first beacon 508 even though the first beacon 508 may be stationary.

Figure 9:
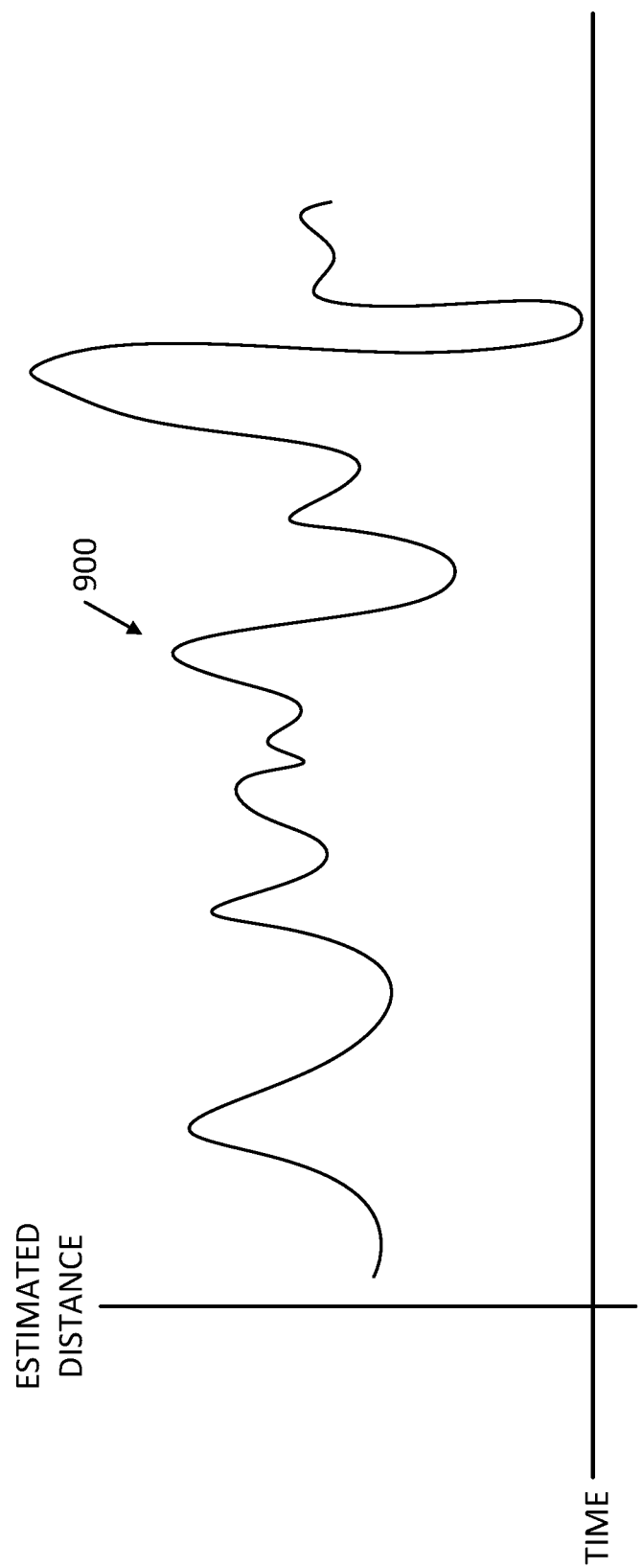
FIG. 9 illustrates an example plot of estimated distances between a hub and a beacon of the example item management system of FIG. 5 over time.

For example, FIG. 9 illustrates an example plot 900 of estimated distances between the first hub 508 and the first beacon 514 determined by the distance estimator 710 over time when the first beacon 514 is stationary as a result of the distance estimator 710 estimating distances based on the first wireless signal 526 and ghost signals. Thus, if the ghost signals are not disregarded or filtered out by the computing system 502, the computing system 502 may determine, for example, inaccurate locations of the items 520, 522, 524, and/or the computing system 502 may indicate that the beacons 514, 516, 518 are moving when the beacon 514, 516, 518 are stationary. Also, as described in greater detail below, each of the beacons 514, 516, 518 is assigned to one of the hubs 508, 510, 512 based on distances between the beacons 514, 516, 518 and the hubs 508, 510, 512. If the ghost signals are not disregarded or filtered out, the computing system 502 may erratically change assignments of the beacons 514, 516, 518 when estimated distances are determined based on signal strengths of ghost signals.

Referring back to FIG. 7, the example computing system 502 includes a noise filter 712 to substantially eliminate the above-mentioned inaccuracies. In the illustrated embodiment, the noise filter 712 includes a quadratic estimator such as a Kalman Filter matrix. In some embodiments, the noise filter 712 inputs estimated distances into the Kalman Filter matrix. The Kalman Filter matrix observes a historical trend of the estimated distances determined via the distance estimator 710 and assigns a first weight to the historical trend and a second weight to an estimated distance determined by the distance estimator 710 to filter out or disregard estimated distances that are determined based on ghost signals. As a result, the Kalman Filter matrix outputs substantially only estimated distances that correspond to actual distances between beacons and hubs (i.e., estimated distances that are derived from the first wireless signal 526, the second wireless signal 528, and the third wireless signal 530 and not ghost signal). For example, if the historical trend indicates that the first beacon 514 has been substantially a first estimated distance from the first hub 508 for the previous two hours, and then the distance estimator 710 determines that the first beacon 514 is a second estimated distance twice as far as the first estimated distance, the Kalman Filter matrix filters out or disregards the second estimated distance based on a probability that the second estimated distance arose from a ghost signal. If the distance estimator 710 thereafter determines that the first beacon 514 is the first estimated distance from the first hub 508, the Kalman Filter matrix does not filter out or disregard the first estimated distance based on a probability that first estimated distance arose from the first wireless signal 526 (i.e., not a ghost signal). As a result, the Kaman filter matrix outputs the first estimated distance.

In some embodiments, the Kalman Filter matrix includes a number of Kalman Filter models corresponding to a number of hubs multiplied by a number of beacons employed by the item management system 500. For example, in the illustrated embodiment, the item management system 500 includes three hubs 508, 510, 512 and three beacons 514, 516, 518. Thus, the Kalman Filter matrix of FIG. 7 may include nine Kalman Filter models. In other embodiments, the Kalman Filter matrix may include other numbers of Kalman Filter models. For example, if an embodiment of the item management system 500 includes 5 hubs and 10 beacons, the Kalman Filter matrix may include 50 Kalman Filter Models.

In some embodiments, the Kalman Filter matrix is tuned by employing experimentally determined constants. For example, in some embodiments, the constants employed by the Kalman Filter matrix are experimentally determined by moving a beacon (e.g., the first beacon 514) predetermined distances, monitoring outputs of the Kalman Filter matrix, and adjusting the constants based on the outputs and the predetermined distances to improve the accuracy of the Kalman Filter matrix (e.g., to decrease a percentage of outputs derived from ghost signals).

In the illustrated embodiment, the beacon assignor 714 assigns each of the beacons 514, 516, 518 to one of the hubs 508, 510, 512 based on which one of the hubs 508, 510, 512 is the shortest estimated distance from the beacons 514, 516, 518, respectively, as output by the Kalman Filter matrix of the noise filter 512. Thus, for example, when the beacons 514, 516, 518 and the hubs 508, 510, 512 are in the layout of FIG. 6, the beacon assignor 714 will assign the first beacon 514 to the first hub 508, the second beacon 516 to the second hub 510, and the third beacon 518 to the third hub 512.

The location determiner 716 determines locations of the first beacon 514, the second beacon 516, and the third beacon 518 based on which one of the hubs 508, 510, 512 each of the beacons 514, 516, 518 is assigned. For example, the first hub 508 is associated with the first area A1. Thus, if the beacon assignor 714 assigns the first beacon 514 to the first hub 508, the location determiner 716 determines that the first beacon 514 is in the first area A1. In some embodiments, the location determiner 716 determines locations of the items 520, 522, 524 based on the respective locations of the beacons 514, 516, 518. For example, if the location determiner 716 determines that the first beacon 514 is in the first area A1, then the location determiner 716 determines that the first item 520 is in the first area A1. In some embodiments, locations of the beacons 514, 516, 518, the items 520, 522, 524 and/or additional and/or alternative information are stored in the database 718, and the ticketing system 120 analyzes the information as, for example, described above in connection with FIGS. 1-4. The computing system 502 communicates the locations of the items 520, 522, 524 and/or additional and/or alternative information to the user device 504 via the network 506 to enable a user of the user device 504 to track and/or manage the items 520, 522, 524.

In some embodiments, the location determiner 716 determines a location of, for example, the first beacon 514 based on which one or more of the hubs 508, 510, 512 are in communication with the first beacon 514 and/or which of the hubs 508, 510, 512 the first beacon 514 is assigned. For example, in the embodiment of FIG. 6, the first beacon 520 is in communication with the first hub 508, the second hub 510, and the third hub 512, and thus, within the first listening range 600, the second listening range 602, and the third listening range 604. As a result, the location determiner 716 may determine that the first beacon 514 is in a portion of the first area A1 (e.g., a Northwest portion of the first area A1) in which the first listening range 600, the second listening range 602, and the third listening range 604 of the hub 508, 510, 512 overlap. In the embodiment of FIG. 6, the location determiner 716 may determine that the third beacon 518 is in a portion of the third area A3 (e.g., a portion that includes a middle and right side of the third area A3) because the third beacon 518 is assigned to the third hub 512 and is in communication with only the third hub 512.

Figure 10:
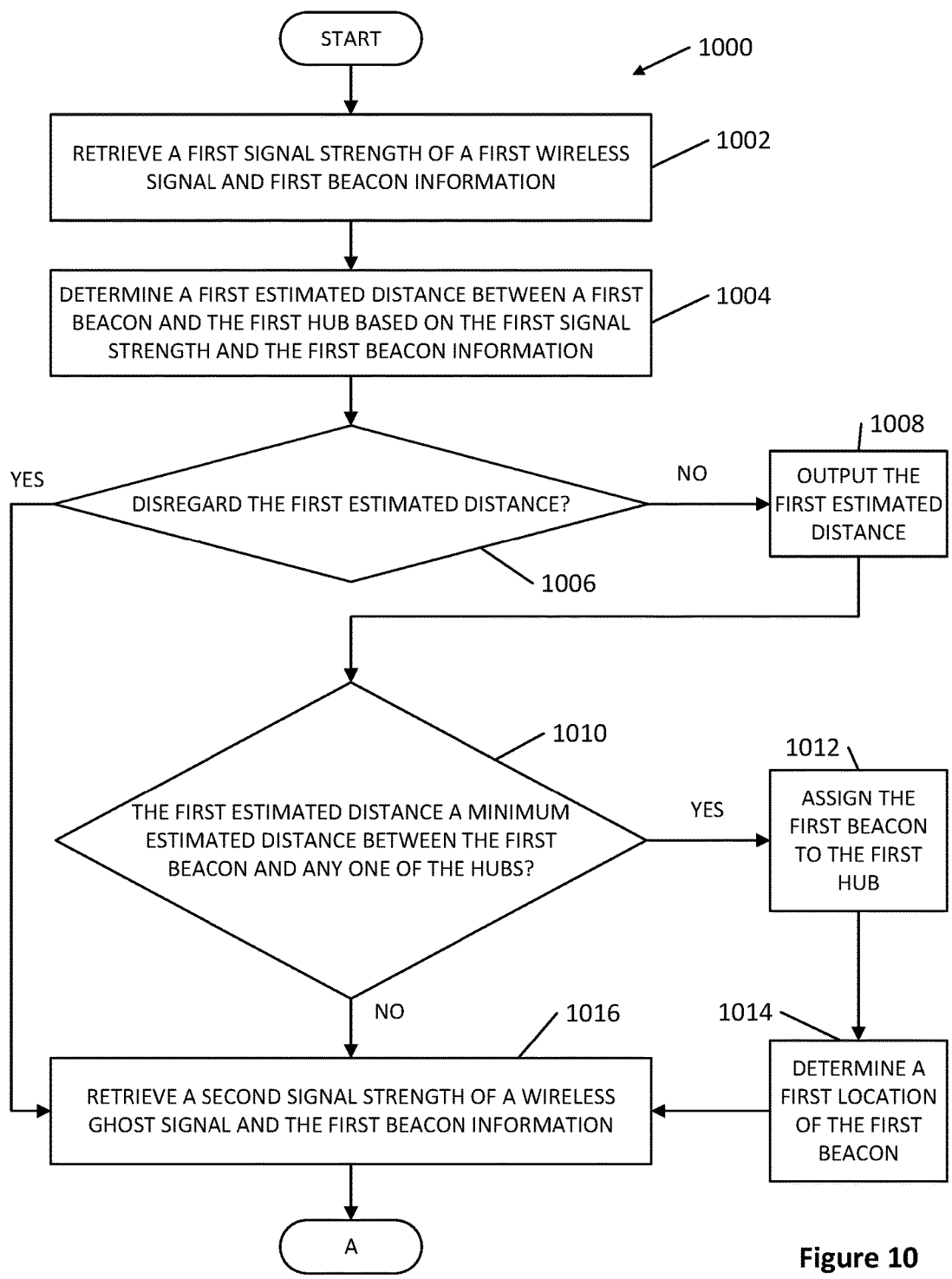
FIGS. 10-12 are flowcharts representative of example machine readable instructions that may be executed to implement the example computing system of FIG. 7.
Figure 11:
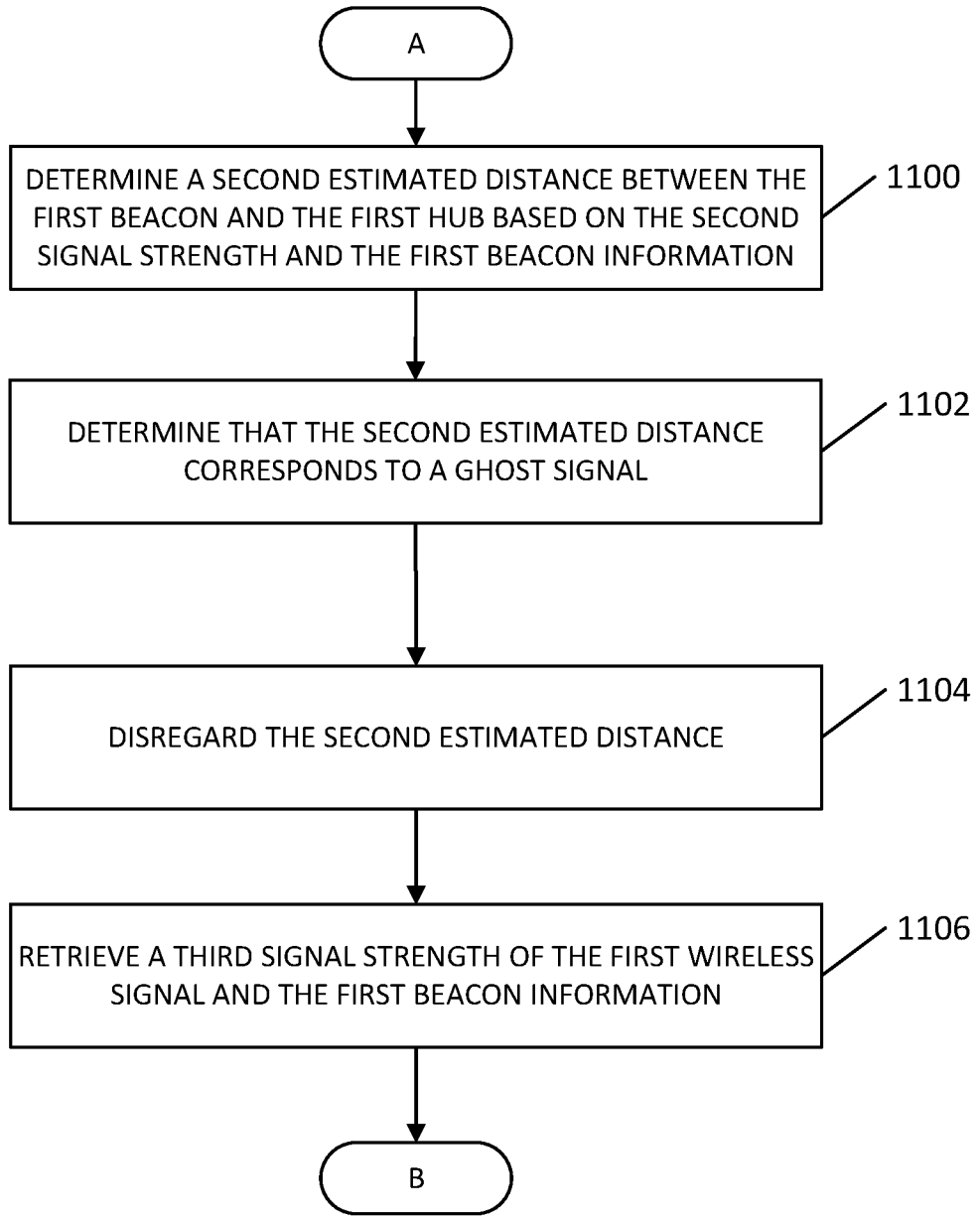
Figure 12:
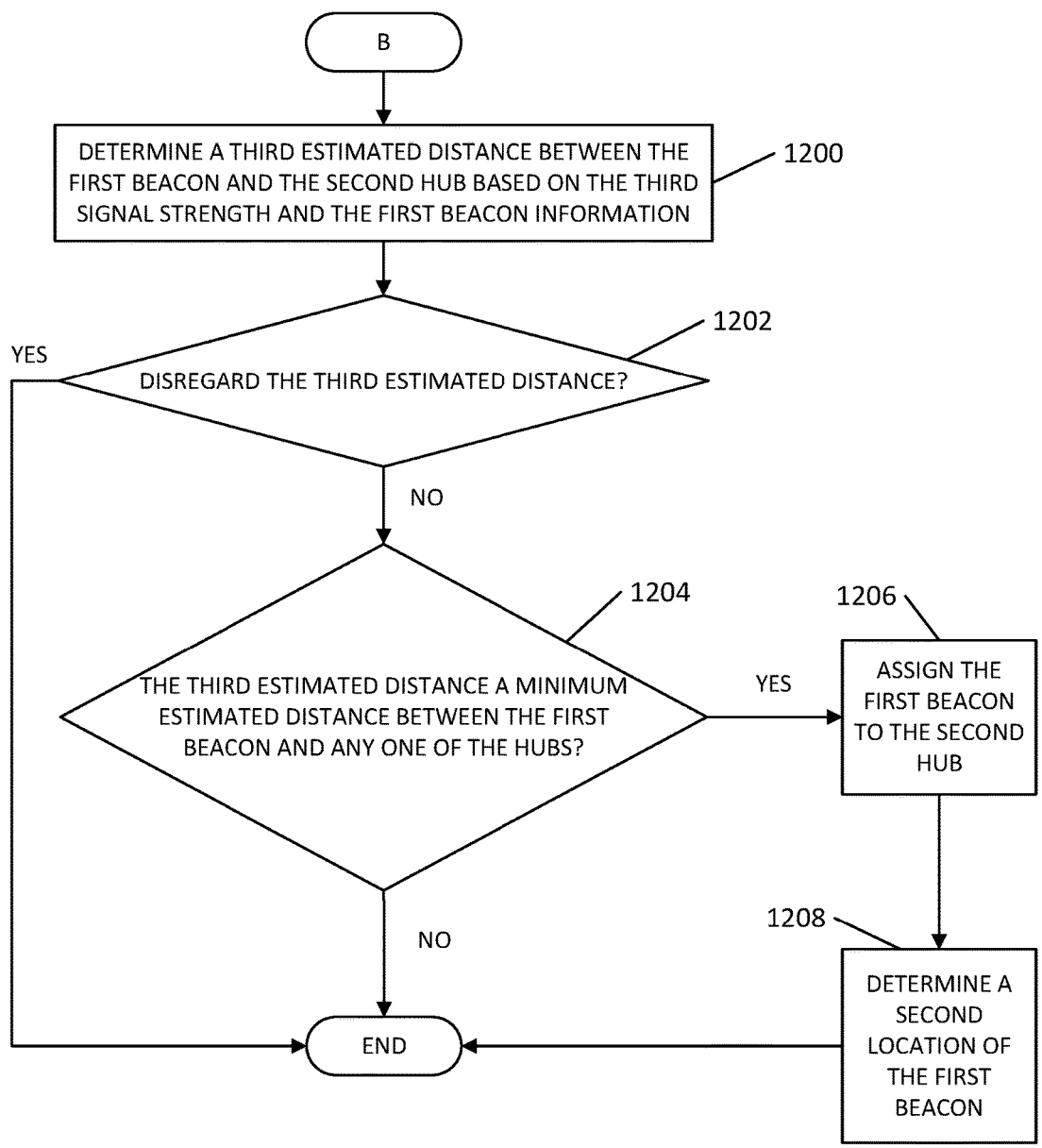

Flowcharts representative of example machine readable instructions for implementing the example computing system 502 of FIGS. 5 and 7 are shown in FIGS. 10-12. The example machine readable instructions may be executed by one or more processors such as the processor 405 and/or the processor 704. The instructions may be embodied in machine readable instructions stored on a tangible and/or non-transitory computer readable storage medium such as a CD-ROM, a floppy disk, a hard drive, a digital versatile disk (DVD), a Blu-ray disk, or a memory associated with the processor, but the instructions and/or parts thereof could alternatively be executed by a device other than the processor and/or embodied in firmware or dedicated hardware. Further, although the example machine readable instructions are described with reference to the flowcharts illustrated in FIGS. 10-12, many other methods of implementing the example computing system 502 of FIGS. 5 and 7 may alternatively be used. For example, the order of execution of the blocks may be changed, and/or some of the blocks described may be changed, eliminated, and/or combined.

The example methods of FIGS. 10-12 may be implemented using coded instructions (e.g., computer and/or machine readable instructions) stored on tangible and/or one or more non-transitory computer and/or machine readable mediums such as a hard disk drive, a flash memory, a read-only memory, a compact disk, a digital versatile disk, a cache, a random-access memory and/or any other tangible and/or one or more non-transitory computer and/or machine readable mediums for any duration (e.g., for extended time periods, permanently, for brief instances, for temporarily buffering, and/or for caching of the information).

FIG. 10 is a flowchart representative of example machine readable instructions that may be executed to implement the computing system 502 and/or carry out block 315 of FIG. 3. Although the flowchart of FIG. 10 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

Turning to FIG. 10, at block 1002, the example method 1000 for tracking and/or managing items begins when the computing system 502 retrieves a first signal strength of the first wireless signal 526 and first beacon information from the memory 702. For example, the first beacon 514 periodically communicates the first wireless signal 526. The first wireless signal includes the first beacon information such as identification information (e.g., the first Universally Unique Identifier (UUID) of the first beacon 514, the first Major value or integer of the first beacon 514, the first Minor value or integer of the first beacon 514) and signal strength information (e.g., the first predetermined signal strength indicator such as a Measured Signal-to-Noise Ratio (SNR), a transmission power, and/or signal strength indicator that is a function of the Measured SNR and/or any other signal strength indicator) of the first beacon 514), and/or any other suitable information. In the illustrated embodiment, the first beacon 514 is within the first listening range 600 of the first hub 508 and, thus, the first hub 508 receives the first wireless signal 526 that includes the first beacon information. The first hub 508 detects the first signal strength of the first wireless signal 526 received by the first hub 508. In some embodiments, the first signal strength is a received signal strength indicator (RSSI). The first hub 508 communicates the first signal strength and the first beacon information to the computing system 502 via the network 506, and the first signal strength and the first beacon information is stored in the memory 702. The distance estimator 710 retrieves the first signal strength and the first beacon information from the memory 702.

At block 1004, the distance estimator 710 determines a first estimated distance between the first beacon 514 and the first hub 508. For example, the first distance estimator 710 may determine the first estimated distance based on the first signal strength and the first predetermined signal strength indicator using, for example, Equation 1 above. In some embodiments, the noise filter 712 inputs the first estimated distance into a Kalman Filter matrix.

At block 1006, the noise filter 712 determines if the first estimated distance should be disregarded or filtered out based on a Kalman Filter matrix. If the noise filter 712 determines that the first estimated distance should not be disregarded or filtered out at block 1006, then the noise filter 712 outputs the first estimated distance to the beacon assignor 714 at block 1008. In some embodiments, the noise filter 712 updates one or more parameters and/or characteristics of the Kalman filter matrix (e.g., a historical trend of estimated distances) based on the first estimated distance not being filtered out. At block 1010 the beacon assignor 714 determines if the first estimated distance is a minimum estimated distance between the first beacon 514 and any one of the hubs 508, 510, 512. For example, the beacon assignor 714 may determine if a second estimated distance (output via the Kalman Filter matrix) between the first beacon 514 and the second hub 510 is less than the first estimated distance and/or if a third estimated distance (output via the Kalman Filter matrix) between the first beacon and the third hub 512 is less than the first estimated distance. If the beacon assignor 714 determines that the first estimated distance is less than both the second estimated distance and the third estimated distance, then the beacon assignor 714 assigns the first beacon 514 to the first hub 508. Thus, the computing system 502 assigns beacons based on their proximity to hubs such that a beacon closest to a hub is assigned to the hub and beacons not closest to the hub are not assigned to the hub. If at block 1010, the beacon assignor 714 determines that the first estimated distance is the minimum distance, then at block 1012 the beacon assignor 714 assigns the first beacon 514 to the first hub 508.

At block 1014, the location determiner 716 determines a first location of the first beacon 514. In some embodiments, the location determiner 716 determines the first location based on the first beacon 514 being assigned to the first hub 508. For example, the first hub 508 is associated with the first area A1 (e.g., via a table stored in the memory 702). Thus, if the beacon assignor 714 assigns the first beacon 514 to the first hub 508, the location determiner 716 determines that the first beacon 514 is in the first area A1. In some embodiments, the location determiner 716 determines that the first item 520 is in the first area A1 based on the first beacon 514 being in the first area A1. For example, the first item 520 may be associated with the first beacon 514. If the location determiner 716 determines that the first beacon 514 is in the first area A1, then the location determiner 716 determines that the first item 520 is in the first area A1. In some embodiments, the computing system 502 communicates the location of the first beacon 514 and/or the first item 520 to the user device 504 via the network 506 to enable a user of the user device 504 to track and/or manage the first item 520. In some embodiments, the computing system 502 updates one or more tables in the database 718 and/or the memory 702 to update and/or include the location of the first beacon 514 and/or the first item 520 and/or additional and/or alternative information.

In the illustrated embodiment, if the noise filter 712 disregards the first estimated distance at block 1006 or if the location determiner 716 determines the location of the first beacon at block 1014, the example method 1000 proceeds to block 1016. However, in other embodiments, the order of execution of the blocks may be changed, and/or some of the blocks described may be changed, eliminated, or combined. For example, in some embodiments, block 1016 may occur after block 1002 and before block 1004.

At block 1016 the computing system 502 retrieves a second signal strength of a first wireless ghost signal and the first beacon information from the memory 702. For example, due to multipath propagation of the first wireless signal 526, the first hub 508 may receive the first wireless ghost signal 800. As a result, the first hub 508 detects the second signal strength of the first wireless ghost signal 800 and communicates the second signal strength and the first beacon information to the computing system 502, which are stored in the memory 702.

Referring to FIG. 11, at block 1100, the distance estimator 710 determines a second estimated distance between the first beacon 514 and the first hub 508 based on the second signal strength and the first beacon information (e.g., using Equation 1 above). At block 1102, the noise filter 712 determines that the second estimated distance corresponds to a ghost signal. For example, the noise filter 712 may input the second estimated distance into the Kalman Filter matrix, which may compare the second estimated distance to a historical trend of estimated distances between the first hub 508 and the first beacon 514. If the second estimated distance deviates from the historical trend by a predetermined extent (e.g., based on a probability determined by the Kalman Filter matrix that the deviation results from multipath propagation), the Kalman Filter matrix may determine that the second estimated distance corresponds to a ghost signal. As a result, at block 1104, the noise filter 712 disregards the second estimated distance. Thus, the noise filter 712 filters out the second estimated distance and/or does not output the second estimated distance to the beacon assignor 714. In some embodiments, the noise filter 712 updates one or more parameters and/or characteristics of the Kalman filter matrix (e.g., a historical trend of estimated distances) based on the second estimated distance being filtered out.

At block 1106, the computing system 502 retrieves a third signal strength of the first wireless signal 526 and the first beacon information. For example, in the layout of FIG. 5, the first beacon 514 is within the second listening range 602 of the second hub 510. Thus, when the first beacon 514 generates the first wireless signal 526, the second hub 510 receives the first wireless signal 526. The second hub 510 then detects the third signal strength of the first wireless signal and communicates the third signal strength and the first beacon information to the computing system 502, which are stored in the memory 702.

Referring to FIG. 12, at block 1200, the distance estimator 710 determines a third estimated distance between the first beacon 514 and the second hub 510 based on the third signal strength and the first beacon information using, for example, Equation 1 above. At block 1202, the noise filter 712 determines if the third estimated distance is to be disregarded. For example, if the third estimated distance corresponds to a ghost signal, the Kalman Filter matrix disregards the third estimated distance, and the example method 1000 ends. If the noise filter 712 determines that the third estimated distance does not correspond to a ghost signal, the noise filter 712 does not disregard the third estimated distance, and the example method 1000 proceeds to block 1204.

At block 1204, the beacon assignor 714 determines if the third estimated distance is a minimum distance between the first beacon 514 and any one of the hubs 508, 510, 512. For example, the beacon assignor 714 may compare the third estimated distance to the first estimated distance. If the first estimated distance is less than the third estimated distance, the beacon assignor 714 determines that the third estimated distance is not the minimum estimated distance between the first beacon 514 and any one of the hubs 508, 510, 512 (i.e., the beacon assignor 714 may determine that the first beacon 514 is closer to the first hub 508 than the second hub 510). As a result, the example method 1000 ends. If the beacon assignor 714 determines that the third estimated distance is less than the first estimated distance (e.g., if the first beacon 514 moved from the position illustrated in FIG. 6 to a position next to the second hub 510) and, thus, is the minimum estimated distance, then the beacon assignor 714 assigns the first beacon 514 to the second hub 510 at block 1206.

At block 1208, the location determiner 716 determines a second location of the first beacon 514. In some embodiments, the location determiner 716 determines the second location based on the first beacon 514 being assigned to the second hub 510. For example, the second hub 510 is associated with the second area A2. Thus, if the beacon assignor 714 assigns the first beacon 514 to the second hub 510, the location determiner 716 determines that the first beacon 514 is in the second area A2 and, thus, has moved from the first area A1 to the second area A2 during execution of the example method 1000. In some embodiments, the location determiner 716 determines that the first item 520 is in the second area A2 based on the first beacon 514 being in the second area A2. For example, the first item 520 may be associated with the first beacon 514. If the location determiner 716 determines that the first beacon 514 is in the second area A2, then the location determiner 716 determines that the first item 520 is in the second area A2. In some embodiments, the computing system 502 communicates the location of the first beacon 514 and/or the first item 520 to the user device 504 via the network 506 to enable a user of the user device 504 to track and/or manage the first item 520.

While this specification contains many specific implementation details, these should not be construed as limitations on the scope of the claims, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be performed. Moreover, the separation of various system components in the embodiments described above should not be understood as requiring such separation in all embodiments, and it should be understood that the described program components and systems may generally be integrated together in a single software product or packaged into multiple software products.

What is claimed is:

1. A system for tracking items comprising:
   a first beacon configured to communicate a first wireless signal, the first wireless signal including a first predetermined signal strength indicator;
   a first hub located in a first area, the first hub configured to receive the first wireless signal and a first wireless ghost signal generated by the first beacon, wherein the first hub is configured to determine a first signal strength of the first wireless signal and a second signal strength of the first wireless ghost signal;
   a second hub located in a second area, the second hub configured to receive the first wireless signal, wherein the second hub is configured to determine a third signal strength of the first wireless signal;
   a memory configured to store the first signal strength, the second signal strength, the third signal strength, and the first predetermined signal strength indicator;
   a processor configured to retrieve the first signal strength, the second signal strength, the third signal strength, and the first predetermined signal strength indicator from the memory, the processor configured to:
      determine a first estimated distance between the first beacon and the first hub based on the first predetermined signal strength indicator and the first signal strength;
      determine a second estimated distance between the first beacon and the first hub based on the first predetermined signal strength indicator and the second signal strength;
      determine a third estimated distance between the first beacon and the second hub based on the first predetermined signal strength indicator and the third signal strength;
      input the first estimated distance, the second estimated distance, and the third estimated distance into a Kalman filter matrix;
      filter out the second estimated distance via the Kalman filter matrix;
      output the first estimated distance and the third estimated distance via the Kalman filter matrix;
      determine that the first estimated distance is less than the third estimated distance;
      assign the first beacon to the first hub based on the first distance being less than the third distance; and
      determine that the first beacon is located in the first area based on the first beacon being assigned to the first hub.

2. The system of claim 1, wherein the first wireless signal is a Bluetooth® signal.

3. The system of claim 1, wherein the processor is configured to filter out the second estimated distance based on a deviation between the second estimated distance and a historical trend of estimated distances between the first beacon and the first hub.

4. The system of claim 1, wherein the Kalman filter matrix includes experimentally determined constants.

5. The system of claim 1, wherein the first hub has a first listening range covering a portion of the first area, and the second hub has a second listening range covering a portion of the second area.

6. The system of claim 5, wherein the first listening range extends a first distance from the first hub, the second listening range extends a second distance from the second hub, the first distance different than the second distance.

7. The system of claim 6, wherein the first hub is in a fixed relative to Earth, and the first beacon is coupled to a portable item.

8. A system, comprising:
   a first beacon configured to communicate a first wireless signal;
   a first hub in communication with the first beacon, the first hub configured to detect a first signal strength of the first wireless signal; and
   a second hub in communication with the first beacon, the second hub configured to detect a second signal strength of the first wireless signal; and
   a computing system in communication with the first hub and the second hub, the computing system including a noise filter and a beacon assignor, wherein the noise filter includes a quadratic estimator configured to output a first estimated distance between the first beacon and the first hub, output a second estimated distance between the first beacon and the second hub, and disregard a third estimated distance between the first beacon and the first hub when the third estimated distance is derived from a ghost signal; and wherein the beacon assignor is configured to assign the first beacon to the first hub when the first estimated distance is less than the second estimated distance.

9. The system of claim 8, wherein the quadratic estimator is a Kalman filter matrix.

10. The system of claim 8, wherein the computing system includes a distance estimator, the distance estimator configured to determine the first estimated distance based on the first signal strength and a predetermined signal strength indicator of the first beacon.

11. The system of claim 10, wherein the distance estimator is configured to determine the second estimated distance based on the second signal strength and the predetermined signal strength indicator.

12. The system of claim 11, wherein the computing system includes a location determiner, the location determiner configured to determine a location of the first beacon based on the first beacon being assigned to the first hub.

13. The system of claim 11, wherein the first wireless signal is a Bluetooth® signal.

14. The system of claim 11, wherein the first hub has a first listening range, the second hub has a second listening range, the first listening range different than the second listening range.

15. The system of claim 14, wherein a first portion of the first listening range overlaps a second portion of the second listening range, the first beacon positioned within the first portion and the second portion.

16. A method comprising:
   retrieving a first signal strength of a first wireless signal from a memory;

retrieving a second signal strength of the first wireless signal from the memory;

retrieving a third signal strength of a second wireless signal from the memory;

determining a first estimated distance between a first beacon and a first hub based on the first signal strength;

determining a second estimated distance between the first beacon and the first hub based on the second signal strength;

determining a third estimated distance between a second beacon and the first hub based on the third signal strength;

determining, via a Kalman filter matrix, that the second estimated distance is derived from a ghost signal of the first wireless signal;

filtering out the second estimated distance via the Kalman filter matrix; and assigning the first beacon to the first hub when the first estimated distance is less than the third estimated distance.

17. The method of claim 16 further comprising communicating a location of the first beacon to a user device, the first location associated with the first hub.

18. The method of claim 16 wherein determining, via the Kalman filter matrix, that the second estimated distance is derived from a ghost signal comprises comparing the second estimated distance to a historical trend of estimated distances.

19. The method of claim 16, wherein determining the first estimated distance between the first beacon and the first hub based on the first signal strength comprises determining the first estimated distance based on the first signal strength and a first predetermined signal strength indicator of the first beacon.

20. The method of claim 16, further comprising assigning the second beacon to a second hub when the second beacon is closer to the second hub than the first hub.

* * * * *